(12) United States Patent
Kober et al.

(10) Patent No.: US 8,329,278 B2
(45) Date of Patent: *Dec. 11, 2012

(54) PANEL WITH HEATED LAYER

(75) Inventors: Jeffrey F. Kober, Milwaukee, WI (US); James E. Desing, Elkhorn, WI (US); John J. Tommet, South Milwaukee, WI (US)

(73) Assignee: Milwaukee Composites, Inc., Cudahy, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,518

(22) Filed: Dec. 21, 2010

(65) Prior Publication Data

US 2011/0147358 A1 Jun. 23, 2011

Related U.S. Application Data

(63) Continuation-in-part of application No. 11/494,049, filed on Jul. 27, 2006, now Pat. No. 7,897,235.

(60) Provisional application No. 60/703,048, filed on Jul. 27, 2005.

(51) Int. Cl.
*B32B 3/02* (2006.01)

(52) U.S. Cl. .......... 428/76; 428/71; 52/309.4; 52/309.8; 52/309.13; 52/784.11; 52/793.1

(58) Field of Classification Search .................. 52/309.4, 52/309.8, 309.13, 309.16, 592.1, 784.11, 52/787.1, 793.1, 800.1; 428/71, 76, 166, 428/188

See application file for complete search history.

(56) References Cited

U.S. PATENT DOCUMENTS

| | | |
|---|---|---|
| 227,934 A | 5/1880 | Walton |
| 3,110,064 A | 11/1963 | Koontz |
| 3,121,262 A | 2/1964 | Loncoske |
| 3,476,422 A | 11/1969 | Campbell |
| 3,535,844 A | 10/1970 | Glaros |
| 3,662,805 A | 5/1972 | Sygnator |
| 3,868,297 A | 2/1975 | Jamison et al. |
| 4,042,746 A | 8/1977 | Hofer |
| 4,093,491 A | 6/1978 | Whelpton et al. |
| 4,361,613 A | 11/1982 | Bogner et al. |
| 4,396,142 A | 8/1983 | Lines, Jr. et al. |

(Continued)

FOREIGN PATENT DOCUMENTS

CN 1216592 A 5/1999

(Continued)

OTHER PUBLICATIONS

"HICOTEC TP" Product Brochure by Frenzelit-Werke GmbH & Co. KG. Possible publication date Mar. 2008.

(Continued)

*Primary Examiner* — Jeanette E Chapman
*Assistant Examiner* — James Buckle, Jr.
(74) *Attorney, Agent, or Firm* — Michael Best & Friedrich LLP

(57) ABSTRACT

A panel has an exterior face thereof adapted for attachment to a support frame and an interior face thereof adapted for defining a boundary of a compartment. The panel includes a core encapsulated within a panel frame of reinforced phenolic material, the core having first and second faces thereof, and a periphery. The panel frame includes first and second skins attached to the first and second faces of the core. One or more closeouts are disposed between the skins about the periphery of the core, with the one or more closeouts being attached to the first and second skins. A heating element is adjacent the interior face of the panel.

58 Claims, 18 Drawing Sheets

U.S. PATENT DOCUMENTS

| | | | |
|---|---|---|---|
| 4,463,043 | A | 7/1984 | Reeves et al. |
| 4,534,886 | A | 8/1985 | Kraus et al. |
| 4,557,961 | A | 12/1985 | Gorges |
| 4,727,701 | A | 3/1988 | Figari |
| 5,102,710 | A | 4/1992 | Kaufman et al. |
| 5,240,543 | A | 8/1993 | Fetterhoff et al. |
| 5,462,623 | A | 10/1995 | Day |
| 5,523,059 | A | 6/1996 | Langer |
| 5,589,243 | A | 12/1996 | Day |
| 5,600,930 | A | 2/1997 | Drucker |
| 5,612,117 | A | 3/1997 | Belanger et al. |
| 5,624,728 | A | 4/1997 | Hoopingarner et al. |
| 5,768,845 | A | 6/1998 | Beaulieu et al. |
| 5,798,160 | A | 8/1998 | Kohn |
| 5,834,082 | A | 11/1998 | Day |
| 5,842,315 | A | 12/1998 | Lin |
| 5,876,652 | A | 3/1999 | Rorabaugh et al. |
| 5,893,248 | A | 4/1999 | Beliveau |
| 6,043,464 | A | 3/2000 | Berger et al. |
| 6,085,485 | A | 7/2000 | Murdock |
| 6,132,836 | A | 10/2000 | Quinif |
| 6,224,835 | B1 | 5/2001 | Langer |
| 6,274,647 | B1 | 8/2001 | Knight et al. |
| 6,311,456 | B1 | 11/2001 | Rodero Antunez |
| 6,458,418 | B2 | 10/2002 | Langer et al. |
| 6,510,807 | B2 | 1/2003 | Gottfried |
| 6,740,381 | B2 | 5/2004 | Day et al. |
| 6,824,851 | B1 | 11/2004 | Locher et al. |
| 6,890,398 | B2 | 5/2005 | Sing |
| 7,147,741 | B2 | 12/2006 | Sing |
| 7,393,577 | B2 | 7/2008 | Day et al. |
| 7,721,500 | B2 | 5/2010 | Clark et al. |
| 7,897,235 | B1 | 3/2011 | Locher et al. |
| 2001/0012552 | A1 | 8/2001 | Cota |
| 2002/0152697 | A1 | 10/2002 | Hokkirigawa et al. |
| 2004/0172893 | A1 | 9/2004 | Hunter |
| 2005/0074593 | A1 | 4/2005 | Day et al. |
| 2007/0009704 | A1 | 1/2007 | Coppo |
| 2007/0125044 | A1 | 6/2007 | Clark et al. |
| 2007/0215589 | A1 | 9/2007 | Berger |
| 2012/0234819 | A1 | 9/2012 | Berger |

FOREIGN PATENT DOCUMENTS

| | | |
|---|---|---|
| CN | 1378504 A | 11/2002 |
| CN | 1381657 A | 11/2002 |
| JP | 6111154 A | 1/1986 |

OTHER PUBLICATIONS

Product Identification sheets for "TC-06-P" and "UC-09-P" by JB Martin Ltd. Published Sep. 2010.

Product Identification Sheet for "TC-06-P" by JB Martin Ltd. Published Jun. 2006.

"Heating Textile" Webpage by Gustav Gerster GmbH & Co. KG. <http://www.gerster-techtex.de/content.php?page_id=896> Printed Mar. 21, 2011. Product Data Sheets for Heating Textiles 15041, 15043, 15044, 15045, and 15051, dated Apr. 1, 2010.

PCT/US2010/061519 International Search Report and Written Opinion dated Sep. 7, 2011, 8 pages.

PANEL WITH HEATED LAYER

CROSS-REFERENCE TO RELATED PATENT APPLICATIONS

This patent application is a continuation-in-part of U.S. patent application Ser. No. 11/494,049, filed Jul. 27, 2006, which claims the benefit of U.S. Provisional Patent Application No. 60/703,048, filed Jul. 27, 2005. The contents of both are incorporated by reference herein in their entirety.

BACKGROUND

This invention relates generally to panels, and more particularly to panels suitable for use in transit conveyances, such as subway cars, high speed cars, rail cars, buses, rapid response vehicles, marine vessels, semi-trailers, van-body "box" trucks, elevator cars, etc.

Public conveyances, such as rail cars, buses, elevators, and the like, are typically subject to government regulations requiring that a passenger compartment of the conveyance be at least partially constructed from fire retardant panels, which provide protection for occupants of the compartment in the event that a fire should occur outside or within the passenger compartment.

For example, in the past, passenger rail cars and buses have sometimes utilized a flooring system in which floor panels, approximately three-quarters of an inch thick, are mounted to the top side of a floor-supporting underframe. Typically the floor panels have been attached to the underframe by various methods, including adhesive bonding, or fastening with screws or other fasteners. The underframe has typically been deep enough to allow a layer of insulation material (usually glass wool, fiberglass, or rock wool), to be laid upon the top surface of a series of thin steel sheets that are then welded to the bottom side of the underframe, to form an underpan assembly. The underframe is sometimes configured to be deep enough that there is an air gap provided between the underside of the floor panel and the insulation material on the top side of the steel underpan. The air gap serves as an insulation zone for heat transfer, in the event of a fire beneath the transit vehicle. Typically, in North America, such a floor structure is required to pass a fire endurance test for passenger fire safety, in which a completed flooring system is mounted over a pit in which a gas burner is located to simulate a fire beneath the vehicle. During the fire test, weights are placed on the top surface of the floor panels, to simulate a typical live floor loading resulting from carrying passengers.

In one common form of a floor panel, used in prior flooring systems for mass transit vehicles, a plywood sheet is sandwiched between, and bonded to, the interior surfaces of two stainless steel or aluminum sheets. This construction results in floor panels that are heavier than is desirable. Also, past experience has shown that, during operation of the mass transit vehicle, the plywood core sometimes is exposed to water, which causes the stainless steel or aluminum sheets to delaminate and the plywood panel to rot.

U.S. Pat. No. 6,824,851, which is assigned to the Assignee of the present invention, and is hereby incorporated in its entirety herein by reference, discloses an approximately three-quarter inch thick phenolic composite flooring system for mass transit vehicles, which provides significant improvement over flooring systems utilizing floor panels having stainless steel or aluminum sheets bonded to the faces of a plywood panel. By virtue of its construction, the phenolic composite flooring system disclosed in U.S. Pat. No. 6,824,851 is considerably lighter in weight than flooring systems utilizing plywood panels clad with stainless steel or aluminum sheets. Also, the flooring system of the '851 patent provides greater ability, than flooring systems using floor panels having a plywood sheet clad with stainless steel skins, to withstand harsh environmental conditions, such as exposure to water or moisture.

Although use of a phenolic composite flooring system, according to U.S. Pat. No. 6,824,851, in a traditional mass transit vehicle constructions, having an insulation material laid on the top surface of thin steel sheets welded to the bottom of a steel underframe to form an underpan assembly, have been shown to provide significant advantages over similar systems utilizing metal clad plywood floor panels, further improvement is desirable.

It is desirable to eliminate the insulation and heavy steel underpan, to reduce weight and complexity of the transit vehicle, and to eliminate the cost of the insulation, the steel underpan, and costs incurred in installing the insulation and underpan onto the underframe of the vehicle, while still providing sufficient flame retardant capability to meet governmental regulations.

Past experience has also shown that use of the air gap and steel underpan in previous mass transit vehicles created a cavity between the underpan and the floor panels which "drummed" during use of the mass transit vehicle. Elimination of the underpan and air gap would also eliminate the cavity, and potentially lead to a quieter passenger cab environment.

It has also been observed that previous, conventional underpan and underframe assemblies, would, from time-to-time, trap water between the bottom of the floor panel and the top side of the underpan. In some instances, large amounts of standing water would be trapped within the cavity between the underpan and the floor panels. As noted above, this standing water sometimes damage the floor panels, and could amount to significant dead weight which had to be carried by the mass transit vehicle.

It is desirable, therefore, to provide an improved fire retardant panel apparatus, and a method of making and using such an improved fire retardant panel apparatus, in a form which addresses one or more of the disadvantages of prior flooring systems for mass transit vehicles. It is further desirable to produce a fire retardant panel for use in other conveyances such as elevators and marine vessels. It is further desirable to provide an improved fire retardant panel, and panel apparatus, for use in defining one or more of the floor, ceiling, and/or walls of a conveyance for transporting passengers or other cargo.

The panels such as floor panels of public conveyances, such as rail cars, buses, elevators, and the like typically offer at least a nominal level of heat insulation that inhibits heat inside the cabin from freely escaping to the outside atmosphere in cold weather, for example. However, separate dedicated heating systems are generally required to maintain a comfortable interior temperature when the conveyance is exposed to cold exterior temperatures.

BRIEF SUMMARY OF THE INVENTION

According to one aspect, the invention provides an improved flame retardant panel apparatus, and method of making and using such an improved fire retardant panel apparatus, through use of a flame retardant panel, having an exterior and an interior face thereof, with the panel including a panel structure having a primary core encapsulated within a panel frame of reinforced phenolic material, and a layer of flame retardant material attached to the panel structure and extending outwardly therefrom to at least partially define an exterior face of the flame retardant panel.

Through use of a flame retardant panel, according to the invention, in a mass transit conveyance, such as a rail car or a bus, for example, the underpan and layer of insulation beneath the floor panel, of prior mass transit flooring systems, can be eliminated, while still providing an enhanced flame retardant capability which meets or exceeds applicable government standards. Through use of a flame retardant panel, according to the invention, weight and complexity of a mass transit flooring system are significantly reduced. In addition, a flame retardant panel, according to the invention, provides improved thermal insulation capabilities, and resistance to sound transmission, as compared to prior flame retardant panel constructions. Flame retardant panels, according to the invention, are also inherently more capable of withstanding exposure to water, and provide an improved moisture barrier, as compared to the metal clad plywood floor panels utilized in prior mass transit vehicles.

In one form of the invention, a flame retardant panel, according to the invention, has an exterior face thereof adapted for attachment to a support frame and an interior face thereof adapted for defining a boundary of a compartment. The flame retardant panel includes a panel structure and a layer of flame retardant material attached to the panel structure. The panel structure includes a primary core encapsulated within a panel frame of reinforced phenolic material. The primary core has first and second faces thereof and a periphery thereof. The panel structure further includes a panel frame including first and second skins, attached to the first and second faces of the primary core, and one or more closeouts disposed between the skins about the periphery of the core, with the one or more closeouts being attached to the periphery of the primary core and to the first and second skins. The layer of flame retardant material is attached to the second skin of the panel frame, and extends outwardly therefrom to at least partially define the exterior face of the flame retardant panel.

In some forms of the invention, the layer of flame retardant material includes a secondary core of material from the group consisting of balsa wood, phenolic foam, and melamine foam, and an additional skin of reinforced phenolic material. The secondary core is sandwiched between, and attached to, the second skin of the composite support structure and the additional skin. The additional skin is integrally joined to the remainder of the panel frame, to thereby fully encapsulate the secondary core within the reinforced phenolic material from which the panel frame is constructed.

In some forms of the invention, the layer of flame retardant material includes a layer of intumescent material attached to the second skin. The layer of intumescent material may be bonded onto the second skin. The layer of intumescent material may be a coating containing a intumescent material, which is sprayed, or otherwise applied onto the second skin. The layer of intumescent coating may also take the form of a composite structure, including an intumescent material disposed in a fibrous mat. In some forms of the invention, the layer of intumescent material includes a cured epoxy resin to form a precured layer of intumescent material which is adhesively bonded to the second skin, utilizing an epoxy or other suitable type of adhesive. In some forms of the invention, the layer of intumescent material is impregnated with phenolic resin and placed against the second skin of reinforced phenolic resin, while the second skin is in an uncured state. The impregnated layer of intumescent material and the second skin are then co-cured. Co-curing of the impregnated intumescent material with the second skin, may be carried out contemporaneously with curing of the remainder of the panel frame of reinforced phenolic material.

In some forms of the invention, the primary core of the panel structure may include a plastic closed cell foam of polyisocyanurate material. The primary core may also be formed from other appropriate materials such as balsa wood.

In some forms of the invention, the panel structure may include one or more ribs of reinforced phenolic material connecting the first and second skins to one another, and disposed inwardly from the periphery of the primary core. The primary core may be a precured reinforced core, including at least one reinforced phenolic rib and two or more foam strips, with the at least one phenolic rib being positioned between two adjacent ones of the two or more foam strips. Alternatively, the primary core may include a plurality of groupings, each formed from a plurality of plastic foam strips helically wound together in a side-by-side relationship, by rovings of fibrous material. The groupings may be disposed in a side-by-side relationship with one another, and joined together by first and second adhesive scrims applied to first and second faces of the primary core, such that facing and faying portions of the fibrous rovings of adjacent groupings form reinforcements for the reinforced phenolic ribs.

A fire retardant panel, according to the invention, may define a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel. The first and second skins may take the form of a stitched composite reinforcing structure of fibrous material, impregnated with phenolic resin. The reinforcing structure of the skins may have first, second and third layers, with the first layer being disposed adjacent the primary core and comprised of substantially randomly directed fibers, the second layer being disposed against the first layer and comprising substantially longitudinally directed fibers, and the third layer being disposed against the second layer and comprising substantially transversely directed fibers, with the first, second, and third layers being stitched together by stitching extending at least partially orthogonally to the longitudinal and transverse axes.

In forms of the invention having an additional skin of reinforced phenolic material, the additional skin may also be constructed as described in the preceding paragraph, with the first layer of the reinforcing structure of the additional skin being attached to the secondary core.

A flame retardant panel, according to the invention, may also include a surfacing veil disposed against the third layer of the reinforcing structure of one of the first, second, or additional skins of reinforced phenolic material.

One or more of the one or more closeouts, in a flame retardant panel, according to the invention, may be machineable to include at least one mating surface. The mating surface may be a lap joint.

Where the interior face, of a flame retardant panel, according to the invention, defines a plane of the panel, a closeout, according to the invention, may include at least one bore therethrough extending substantially perpendicularly to the plane of the panel. The primary core, in a flame retardant panel, according to the invention, may include at least one tapping block, with the tapping block including a block of reinforced phenolic material and a metal plate encapsulated within the block. The tapping plate may be adapted to be drilled and tapped, so as to provide the panel with a mounting area.

A flame retardant panel, according to the invention, may include a heating element adjacent to the interior face of the panel. The heating element may be embedded into the first skin of the panel, and integrally joined thereto by the phenolic material. The heating element may also be adhesively bonded onto the first skin of the panel, using an appropriate adhesive. The heating element may be encapsulated within a sheath of urethane material, and be adhesively bonded to the first skin with an epoxy adhesive, or another appropriate adhesive.

A flame retardant panel, in accordance with the invention, may include a conduit embedded within the panel and having first and second openings into the conduit through at least one of the interior and/or exterior faces of the panel or the perimeter such that the conduit continues from panel to panel.

The invention may also take the form of a flame retardant panel apparatus, having multiple interconnected panels, each including an exterior face thereof adapted for attachment to a support frame and an interior face thereof adapted for defining a boundary of a compartment, with at least one of the panels of the flame retardant panel apparatus being a flame retardant panel according to the invention.

A flame retardant panel apparatus, in accordance with the invention, may take the form of a flooring apparatus for a conveyance. The conveyance may be an elevator, including a floor support structure adapted for attachment thereto of the flooring apparatus according to the invention. The conveyance may be a vehicle or a vessel including a floor support structure adapted for attachment thereto of a flooring apparatus according to the invention. The vehicle or vessel may be a mass transit vehicle or vessel.

The invention may also take the form of a method for constructing and/or using a flame retardant panel, or a flame retardant panel apparatus, in accordance with the invention.

In one form of the invention, a method is provided for constructing a flame retardant panel, having an exterior face thereof adapted for attachment to a support frame and an interior face thereof adapted for defining a boundary of a compartment. The method includes forming a panel structure, and attaching a layer of flame retardant material to the panel structure. The panel structure is formed by encapsulating a primary core within a panel frame of reinforced phenolic material, in such a manner that the primary core has first and second faces thereof, and a periphery thereof, and such that the panel frame includes first and second skins attached to the first and second faces of the primary core and one or more closeouts disposed between the skins about the periphery of the primary core, with the one or more closeouts being attached to the periphery of the primary core and to the first and second skins. The layer of flame retardant material is attached to the second skin of the panel frame and extends outwardly therefrom, such that the layer of flame retardant material at least partially defines the exterior face of the panel.

A method, according to the invention, may include forming the layer of flame retardant material from a secondary core, and an additional skin of reinforced phenolic material, where the secondary core is formed from a material selected from the group consisting of balsa wood, phenolic foam, and melamine foam. The method includes attaching the secondary core between the second skin of the panel structure and the additional skin. A method, according to the invention, may further include integrally joining the additional skin to the remainder of the panel frame, of the panel structure, to thereby fully encapsulate the secondary core within the reinforced phenolic material of the panel frame.

Alternatively, a method for constructing a flame retardant panel, in accordance with the invention, may include forming the layer of flame retardant material by attaching an intumescent material to the second skin of the panel structure.

In some forms of the invention, the thickness of a fire retardant panel, according to the invention, may vary and include at least a first and a second thickness thereof, within the periphery of the primary core. The layer of flame retardant material attached to the second skin of the panel frame and extending outwardly therefrom to at least partially define the exterior surface of the panel may extend across the entirety of the exterior face of the panel, throughout both the first and second thicknesses of the panel. Alternatively, the layer of flame retardant material attached to the second skin of the panel frame and extend outwardly therefrom to at least partially define the exterior surface of the panel may extend only partially across the entirety of the exterior face of the panel, throughout one, but not both of the first and second thicknesses of the panel. In some forms of the invention, a first flame retardant structure may be utilized in areas of the panel having the first thickness, and a second flame retardant structure may be utilized in areas of the panel having the second thickness. For example, a flame retardant structure including a secondary core of flame retardant material may be utilized in areas of the panel having the first thickness, and a second flame retardant structure including an intumescent material may be utilized in areas of the panel having the second thickness.

Similarly, even where the panel has a substantially uniform thickness, the layer of flame retardant material may include first and second sections thereof having different flame retardant structures. For example, the first section of the layer of flame retardant material may be formed from a secondary core and an additional skin, according to the invention, with the second section of the layer of flame retardant material being formed from an intumescent material attached to the second skin of the panel structure in the second section of the flame retardant layer.

In one aspect, the invention provides a panel having an exterior face thereof adapted for attachment to a support frame and an interior face thereof adapted for defining a boundary of a compartment. The panel includes a core encapsulated within a panel frame of reinforced phenolic material, the core having first and second faces thereof, and a periphery. The panel frame includes first and second skins attached to the first and second faces of the core. One or more closeouts are disposed between the skins about the periphery of the core, with the one or more closeouts being attached to the first and second skins. A heating element is adjacent the interior face of the panel.

In another aspect, the invention provides a method of manufacturing a heated composite panel. A core is provided. Closeouts are positioned around the core to surround the core and define a periphery of the panel, the closeouts having a density greater than a density of the core and including a plurality of recessed pockets. A heating element is provided including a carbon fiber sheet extending between two opposed electrical buses. The heating element is placed onto the core such that the electrical buses are received in at least one of the plurality of recessed pockets and the carbon fiber sheet extends over at least a portion of the core. The core and the closeouts are sandwiched between a first reinforced phenolic skin and a second reinforced phenolic skin to encapsulate the core and embed the carbon fiber heating element within the panel.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
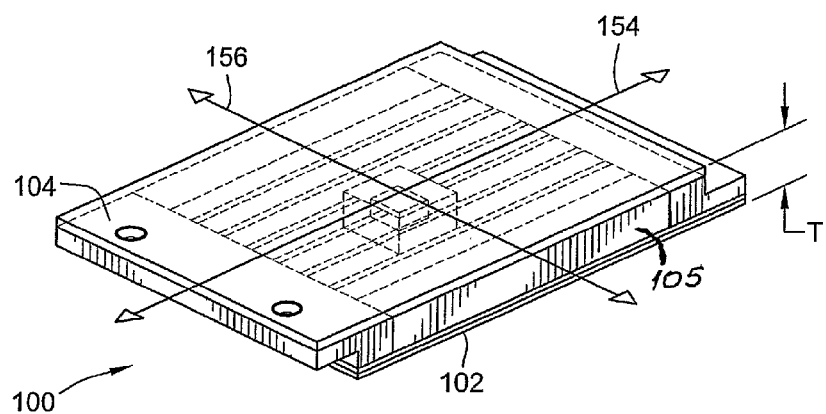
FIG. 1 is a perspective illustration of a first exemplary embodiment of a fire retardant panel, in accordance with the invention.
Figure 2:
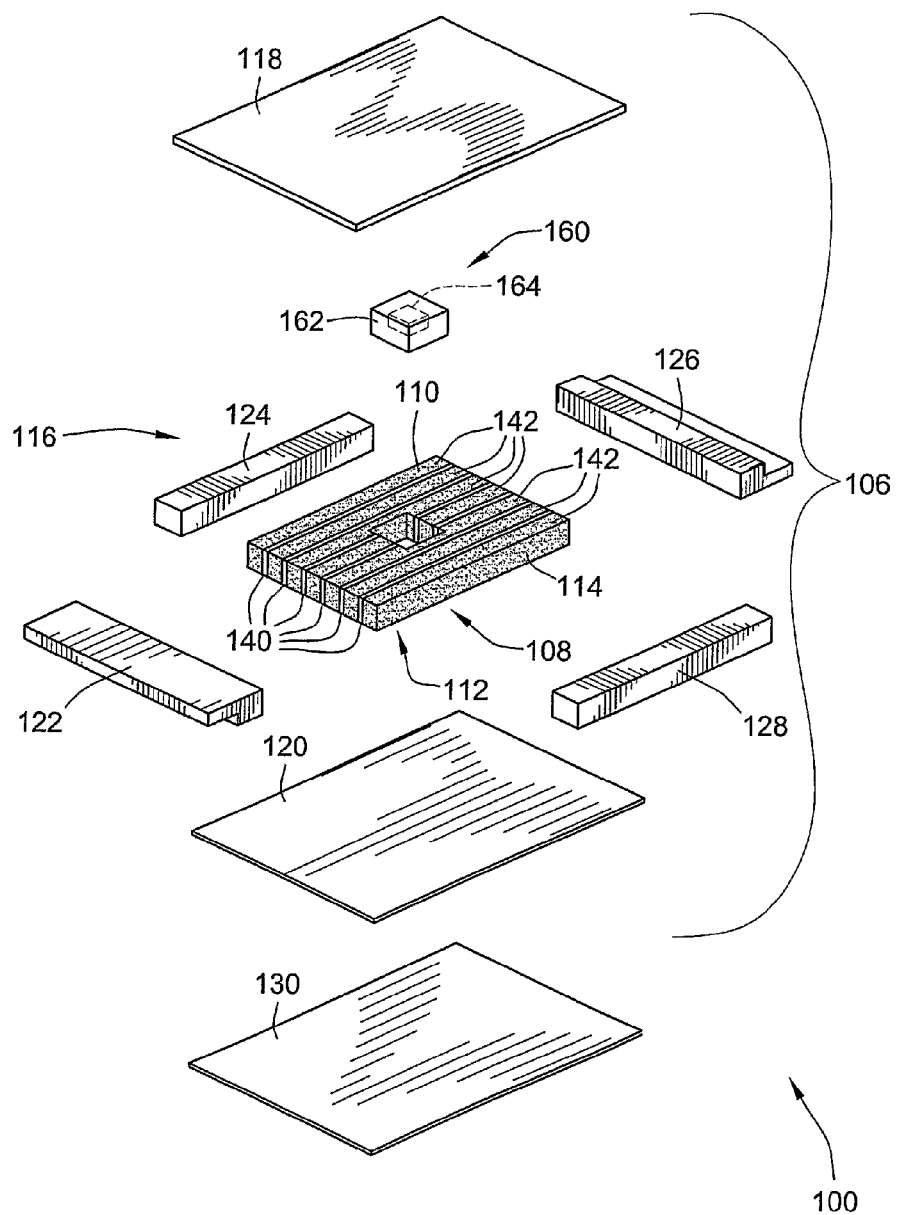
FIG. 2 is an exploded perspective illustration, showing the internal components and construction of the exemplary embodiment of the fire retardant panel shown in FIG. 1.

FIGS. 1 and 2 illustrate a first exemplary embodiment of a flame retardant panel 100, according to the invention, with FIG. 1 showing the flame retardant panel in a completed state, ready for attachment to a support frame, and FIG. 2 illustrating various components of the flame retardant panel 100 in an exploded perspective fashion.

As shown in FIGS. 1 and 2, the first exemplary embodiment of a flame retardant panel 100, according to the invention, has an exterior face 102 thereof, adapted for attachment to a support frame (not shown), an interior face 104 thereof, adapted for defining a boundary of a compartment and a perimeter 105 thereof extending around the panel 100 between the interior and exterior faces 104, 106 of the panel 100. The flame retardant panel 100 includes a panel structure 106 including a primary core 108 having first and second faces 110, 112 thereof and a periphery 114 thereof. In the first exemplary embodiment of the flame retardant panel, as illustrated in FIG. 2, the primary core 108 has essentially a planar shape, with the first and second faces 110, 112 forming spaced parallel planes, and the periphery 114 being substantially rectangular in shape. In other embodiments of the invention, flame retardant panels, and components thereof may have shapes differing considerably from those illustrated in the exemplary embodiment of the flame retardant panel 100 shown in FIGS. 1 and 2.

In the panel structure 106 of the exemplary embodiment 100, the primary core 108 is encapsulated within a panel frame of reinforced phenolic material, (illustrated generally by reference numeral 116 in FIG. 2), formed by the combination of first and second skins 118, 120, attached to the first and second faces 110, 112 of the primary core 108, and four closeouts 122, 124, 126, 128, disposed between the skins 118, 120 about the periphery 114 of the primary core 108. The four closeouts 122, 124, 126, 128 are attached to the periphery 114 of the primary core 108, and to both the first and second skins 118, 120.

A layer of flame retardant material 130 is attached to the second skin 120 of the panel frame 116, and extends outwardly from the second skin 120, to at least partially define the exterior face 102 of the flame retardant panel 100. The flame retardant layer 130 is illustrated as a solid slab in FIG. 2, but as will be understood from the description below, in various embodiments of the invention the layer of flame retardant material 130 may take a variety of forms and include multiple elements thereof.

Figure 3:
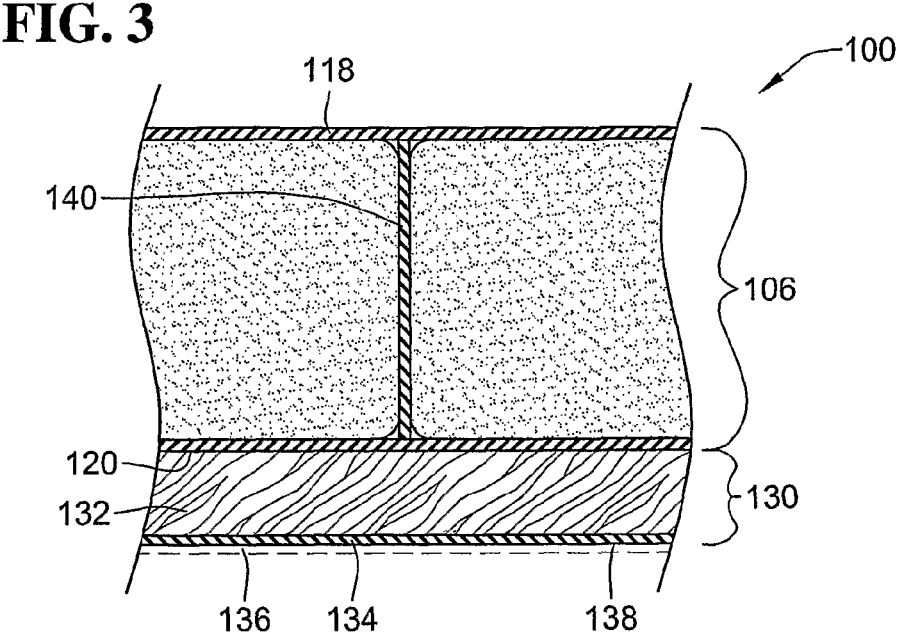
FIG. 3 is a partial cross-sectional illustration of an exemplary embodiment of a fire retardant panel, according to the invention, which includes a fire retardant layer having a secondary core of fire retardant material.

As shown in FIG. 3, for example, the layer of flame retardant material 130 may include a secondary core 132 formed from material selected from the group consisting of balsa wood, phenolic foam, and melamine foam. In the embodiment shown in FIG. 3, the layer of flame retardant material further includes an additional skin 134 of reinforced phenolic material, with the secondary core 132 being sandwiched between and attached to the second skin 120 of the composite support structure 106 and the additional skin 134. The additional skin 134 is integrally joined to the remainder of the panel frame 116, by the closeouts 122, 124, 126, 128, to thereby fully encapsulate the secondary core 132 within the reinforced phenolic material comprising the panel frame 116.

The choice of materials for the secondary core 132 will be dependent upon a variety of factors, unique to a particular embodiment and application of the present invention. Such factors as the thickness of the primary core 108, and the secondary core 132 are relevant in making the choice of materials for both the primary and secondary cores 108, 132. In general, it is contemplated that the primary core 108 of the present invention will have a substantially greater thickness than the core of the applicant's '851 floor panel. For example, it is contemplated that, in practicing the present invention, it may be desirable to have the primary core have a thickness in the range of two inches, or more, to enhance thermal resistance, acoustic resistance, and structural strength of the fire retardant panel 100. It is noted, however, that the invention may be practiced in fire retardant panels 100, having an overall thickness T of ¾ of an inch, for example.

Specifically, with regard to factors considered in selecting a material for a secondary core 132, according to the invention, it is generally contemplated that a preferred thickness for the secondary core would be in the range of ¼ to ¾ inches, with a nominal ½ inch thickness being generally acceptable. The invention may be practiced, however, with secondary cores 132 having substantially greater or lesser thicknesses than these. It is also contemplated, that, in some embodiments of the invention, the secondary core 132 may have a thickness which is substantially greater than the thickness of the primary core 108. For example, where it is desirable to have a floor panel of a mass transit conveyance have a thickness of ¾ of an inch above a floor support frame, to match the thickness of prior floor panels, the panel structure 106 of a flame retardant floor panel, according to the invention, may have an overall thickness, across the first and second skins and primary core 118, 120, 108, of ¾ of an inch, with the secondary core 132 and additional skin 134 extending a larger distance, such as two to three inches, for example, below the second skin 120 of the panel structure 106.

In general, balsa wood will have the lowest cost of any of the materials listed above, for use as a secondary core 132, according to the invention. Phenolic foam will typically cost somewhat more than balsa wood, but provides enhanced thermal insulation, as compared to the same thickness of balsa wood. Melamine foam, also typically costs more than balsa wood, but provides superior acoustic insulation, as compared to balsa wood. Generally therefore, where lowest cost is a primary objective, it is contemplated that a secondary core 132 of balsa wood will be preferred, in practicing the invention. Where enhanced thermal performance is desired, a secondary core of phenolic foam may be preferable. Where enhanced acoustic damping performance is required, a secondary core of melamine foam may be the preferred choice.

As an alternative to having the additional skin 134 integrally joined to the remainder of the panel frame 116 by the closeouts 122, 124, 126, 128, secondary closeouts of reinforced phenolic material (not shown) may be positioned about all, or a portion of the periphery of the secondary core 132, in alternate embodiments of the invention. Alternatively, the additional skin 134 may be configured to wrap around the edges of the secondary core 132, for attachment to the remainder of the panel frame 116, in a manner which fully encapsulates the secondary core 132 within the reinforced phenolic material comprising the panel frame 116 and the additional skin 134.

As indicated by a dashed line, in FIG. 3, in alternate embodiments of the invention, the layer of flame retardant material 130 may further include a layer of intumescent material 136 attached to a second face 138 of the additional skin 134. The layer of intumescent material 136 may take a variety of forms, bonded onto the second face 138 of the additional skin 134. For example, the layer of intumescent material 136 may take the form of a coating containing an intumescent material which is sprayed onto, or otherwise applied to the second face 138 of the additional skin 134. Alternatively, the layer of intumescent material 136 may be a composite structure including an intumescent material disposed in a fibrous mat. Such materials are disclosed in U.S. Pat. No. 5,523,059, for example. One such material, having an unexpanded exfoliating intumescent material disposed in a fiber mat is sold under the trade name, Technofire®, by Technical Fibre Products of Newburgh, N.Y., US. In some forms of the invention, the fibrous mat having the intumescent material disposed therein is impregnated with a resin, such as an epoxy, to form a pre-cured layer of intumescent material, which is then bonded to the second face 138 of the additional skin 134 with an adhesive, such as an epoxy. In other embodiments, the fibrous mat containing the intumescent material is impregnated with phenolic resin and placed against the second face 138 of the additional skin 134, while the additional skin 134 is in an uncured state, and the layer of intumescent material 136 and the additional skin 134 are co-cured.

The choice of attaching the fibrous mat containing intumescent material 136 to the additional skin 134 by co-curing, or alternatively by attaching a pre-cured layer 136 of intumescent material to the additional skin 134 may be made as a function of how rapidly it is desired that the intumescent material be activated. Specifically, phenolic resins have higher temperature capabilities then epoxy resins, and will slow the rate at which the intumescent material begins to expand out of the layer of intumescent material 136.

Where the layer of intumescent material 136 is provided by applying a coating to the second surface 138 of the additional skin 134, either ceramic based or non-ceramic based intumescent coatings may be used in practicing the invention. Suitable intumescent coatings, for use in practicing the invention, are available from Micro Phase Coatings, Inc. of Garner, N.C., US. or Avtec Industries of Hudson, Mass., US.

Figure 4:
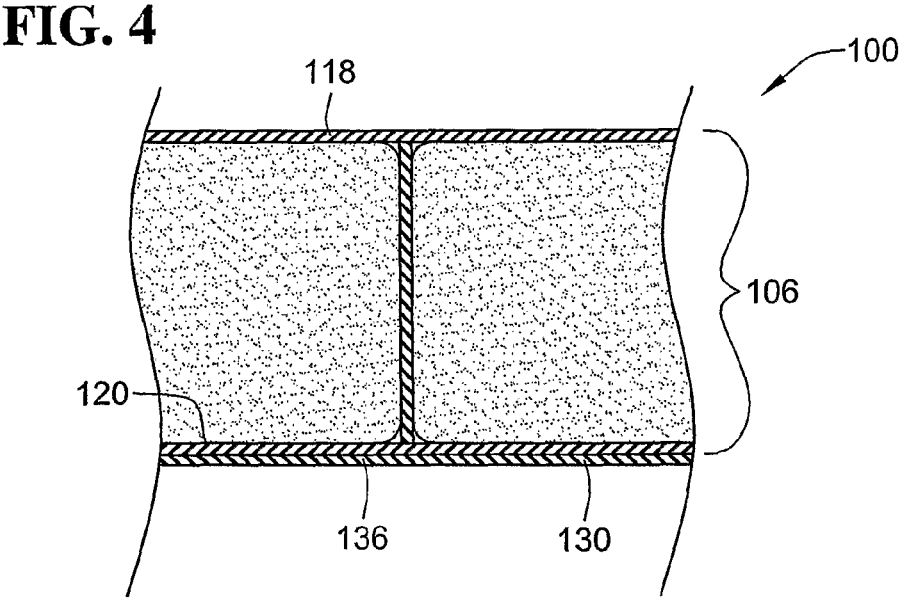
FIG. 4 is a partial cross-sectional view of an exemplary embodiment of the invention having a layer of intumescent material at least partially defining an exterior face of a flame retardant panel, according to the invention.

FIG. 4 illustrates a variation of the first exemplary embodiment of the flame retardant panel 100, in which the layer of flame retardant material 130 is formed by a layer 136 of intumescent material which is attached directly to the second skin 120 of the panel structure 106. The layer of intumescent material 136 utilized as shown in FIG. 4, may take any of the forms and be attached by any of the methods described above in relation to the embodiment shown in FIG. 3.

As shown in FIGS. 2-4, the first exemplary embodiment of the flame retardant panel 100 also includes one or more ribs 140 of reinforced phenolic material connecting the first and second skins 118, 120 to one another. The ribs 140 are disposed inwardly from the periphery 114 of the primary core 108.

In the exemplary embodiment 100 shown in FIG. 2, the primary core 108 is a pre-cured reinforced core, including a plurality of the reinforced phenolic ribs 140 alternated with a plurality of foam strips 142, with the phenolic ribs 140 being generally positioned between two adjacent ones of the foam strips 142. The construction of such a pre-cured reinforced core is disclosed in detail in commonly assigned U.S. Pat. No. 6,824,851 B1, which has hereinabove been incorporated into the disclosure of the present invention by reference.

In manufacturing a fire retardant panel, according to the present invention, utilizing the pre-cured reinforced core 108, the various components of the fire retardant panel 100 are stacked in a platen press, substantially in the manner indicated in FIG. 2, with uncured phenolic resin being applied between the various components where it is desired to have the components adhere to one another, and the stacked uncured structure is subjected to pressure and heat to cure the phenolic material to thereby integrally bond the components of the fire retardant panel 100 to one another.

Figure 5:
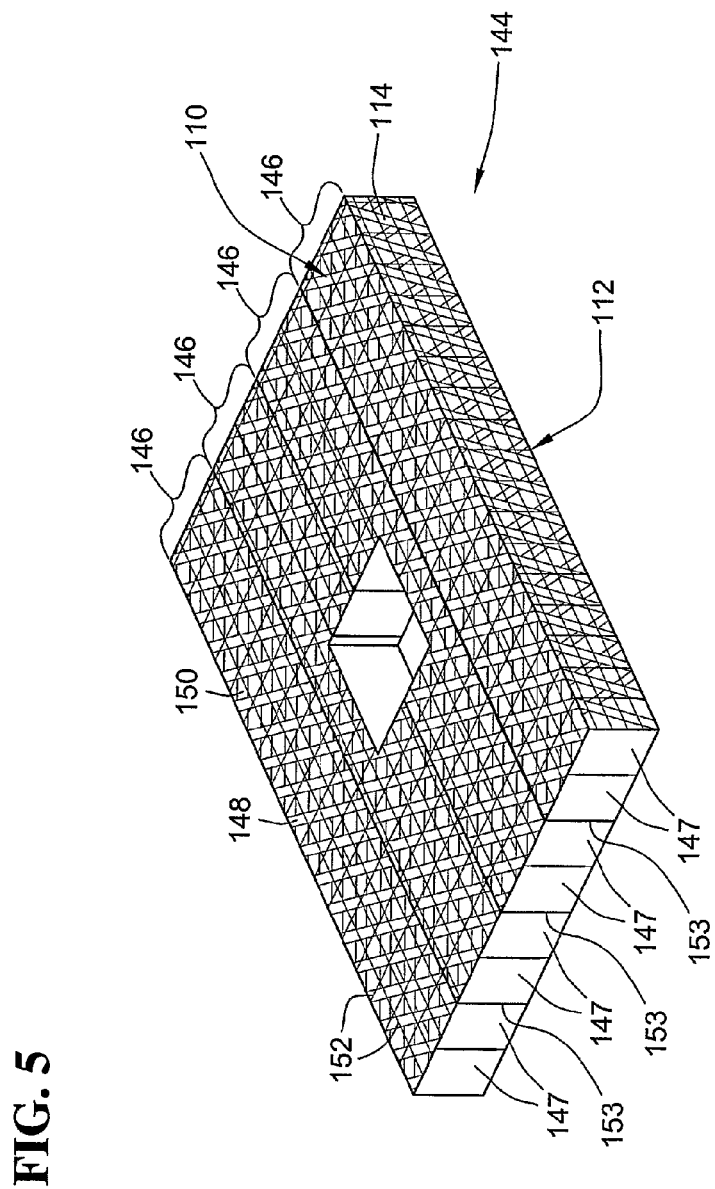
FIG. 5 is a perspective illustration of an alternate embodiment of a primary core of the exemplary embodiment of the fire retardant panel shown in FIG. 1.

In practicing the present invention, it is not required to use a pre-cured core, of the type disclosed in the common assignee's U.S. Pat. No. 6,824,851 B1. In an alternate embodiment of a primary core 144, in a fire retardant panel, according to the invention, illustrated in FIG. 5, the primary core 144 comprises four groupings 146, each formed from two plastic foam strips 147 which are bonded together in a side-by-side relationship and strengthened with an overwind of helically directed rovings 148, 150 of fibrous material. The rovings 148, 150 are more-or-less oppositely directed, and placed in alternating layers, such that the plastic foam strips 147 in each grouping are relatively tightly bound together by the rovings 148, 150. The groupings 146 are disposed in a side-by-side relationship with one another, and joined by first and second scrims 152 adhesively bonded respectively to the first and second faces 110, 112 of the primary core 144, in such a manner that faying portions 153 of the fibrous rovings 148, 150 form dry, un-impregnated reinforcements for the reinforced phenolic ribs 140.

When constructing the flame retardant panel 100, utilizing the alternate primary core 144, the various components of the flame retardant panel 100 are stacked into a platen press, along with the primary core 144 in the same manner as described above for a flame retardant panel 100 utilizing a pre-cured primary core 108, and additional un-cured phenolic resin is applied to the first and second faces 110, 112 of the core 144. During the curing process, application of pressure and heat causes the uncured phenolic resin to flow into the rovings 148, 150 and through the reinforcements 153 formed by adjacent groupings 146, to thereby form the reinforced phenolic ribs 140.

In practicing the invention, where the fire retardant panel 100 defines (see FIG. 1) a longitudinal axis 154 thereof, a transverse axis 156 thereof extending substantially perpendicularly to the longitudinal axis 154, and a thickness T thereof extending substantially orthogonally to both the longitudinal and transverse axes 154, 156 of the panel 100, with both the longitudinal and transverse axes 154, 156 lying substantially within a plane defined by the interior face 104 of the panel 100, the first and second skins 118, 120 may include a stitched composite reinforcing structure (not shown) of fibrous material, impregnated with phenolic resin. As is known in the art, the reinforcing structure of the skins 118, 120 may have first, second, and third layers, with the first layer being disposed adjacent the primary core 108 (144) and including only substantially randomly directed fibers, the second layer being disposed against the first layer and comprising substantially only longitudinally directed fibers, and the third layer being disposed against the second layer and comprising substantially only transversely directed fibers, with the first, second, and third layers being stitched together by stitching extending at least partially orthogonally to the longitudinal and transverse axes 154, 156. In embodiments of the invention utilizing an additional skin 134, the additional skin 134 may also include a three-layered stitched composite reinforcing structure of fibrous material, impregnated with phenolic resin, of the type described hereinabove with regard to the first and second skins 118, 120, with the first layer of the reinforcing structure of the additional skin 134 being disposed against the secondary core 132.

A flame retardant panel, according to the invention, may further include a surfacing veil (not shown), as is known in the art, disposed against at least one of the first, second, or additional skins 118, 120, 134, adjacent either the exterior or interior face 102, 104 of the flame retardant panel 100.

Figure 6A:
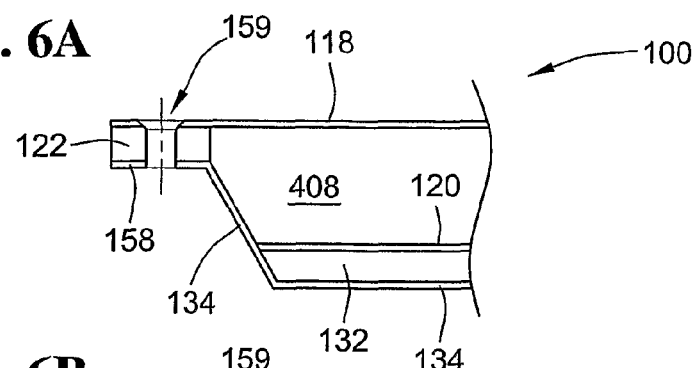
FIGS. 6A-6D are partial cross-sectional illustrations of an edge of a flame retardant panel, according to the invention, taken along line 6-6 in FIG. 8B, illustrating construction details of several alternate embodiments of the invention.
Figure 6B:
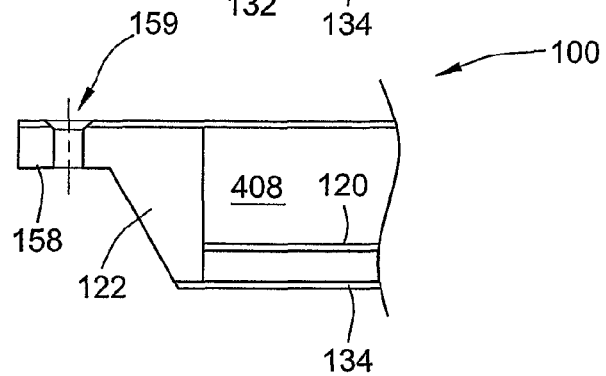
Figure 6C:
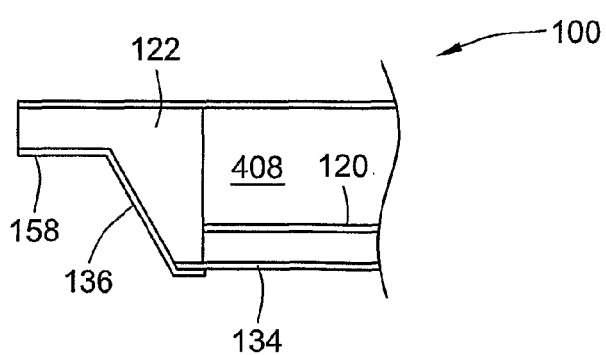
Figure 6D:
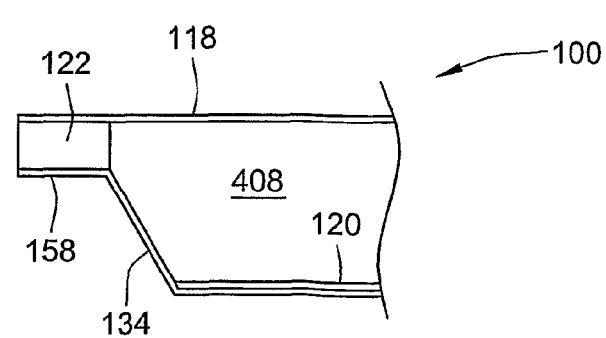

As illustrated in FIGS. 6A-6D, one or more of the closeouts 122, 124, 126, 128, of the first exemplary embodiment of the fire retardant panel 100, may be machineable to include at least one mating surface 158, such as the lap joint shown in FIGS. 6A-6D. As shown in FIG. 1, and FIGS. 6A and 6B, the closeout 122, in the completed panel 100, includes a pair of bores 159 extending therethrough in a direction substantially perpendicularly to the plane of the panel 100 defined by the longitudinal and transverse axes 154, 156. The closeouts 122, 124, 126, 128, may also take a variety of forms, as illustrated in FIGS. 6A-6D. FIGS. 6A-6D also illustrate other details of various alternate embodiments of the invention, in which the fire retardant panel 100 includes a beveled surface, either as part of or adjacent to the closeout 122.

FIGS. 6A-6D further illustrate various alternate embodiments, and placements of components in the fire retardant layer. For example, in FIG. 6C, a layer of intumescent material 136 is utilized on the mating surface 158 and angled side of the panel 100, in combination with a fire retardant layer having a secondary core and additional skin 134. In FIGS. 6A-6D, and also in FIGS. 9A-9D, as described below, the primary core of the various alternate illustrated embodiments has been designated with reference numeral 408, to indicate that the primary core 408 may take the form of the exemplary cores 108, or 144, as described hereinabove, or any other form within the scope of the invention.

In similar fashion, the primary core 108 (144) may also include a variety of materials, additional components, and have configurations other than those specifically illustrated herein. In some embodiments of the invention, the primary core 108 (144) may include a plastic closed cell foam of polyisocyanurate material. The primary core 108 (144) may also be fabricated from a variety of other appropriate materials, such as balsa wood.

As shown in FIG. 2, the primary core 108 (144) may further include at least one tapping block, including a block 162 of reinforced phenolic material, and a metal plate 164 encapsulated within the block 162. The tapping plate 164 is adapted to be drilled and tapped so as to provide a mounting area, for seating arrangements, for example, in the flame retardant panel 100.

FIGS. 7A-7E illustrate a flame retardant panel apparatus, in the form of a flooring apparatus 200 of a conveyance, illustrated by an under floor support frame 202 of a passenger rail car. The flame retardant floor panel apparatus 200 includes multiple interconnected panels, in the form of a center panel 204 and a pair of identical, reversible, end panels 206. Each of the multiple interconnected panels 204, 206, 206 includes an exterior face 208 thereof, adapted for attachment to the support frame 202 and an interior face 210 thereof adapted for defining a boundary, in the form of a floor, of a passenger compartment (not shown). In the panel apparatus 200, all of the panels 204,206,206 are flame retardant panels, constructed in accordance with the present invention.

In general, the flame retardant panels 204, 206, 206 of the flooring apparatus 200 are constructed in the same manner as described hereinabove with regard to the first exemplary embodiment of a flame retardant panel 100, according to the invention. It will be noted, however, that the panels 204, 206 of the flooring apparatus 200 have a first thickness T thereof in sections of the exterior face 208 which are aligned with spaces, as illustrated at 212, which are defined by the longitudinal rails 214, 216, 218, and cross members 220 of the support frame 202, and a second, thinner, thickness t in sections of the flooring panels 204, 206, 206 aligned above the various members 214, 216, 218, 220 of the support frame 220, when the flooring panels 204, 206, 206 are placed in position on the support frame 202. This arrangement of two thicknesses T, t is utilized in the exemplary embodiment of the flooring apparatus 200, so that the smaller thickness t can match the thickness, for example, three-quarters of an inch, of prior and existing floor panels used in conveyances such as rail cars and/or buses. The thickness T of the panels 204, 206, 206 is increased in areas where the panels 204, 206, 206 do not rest on the support frame 202, in order to provide room for the primary core to be made thicker, to thereby provide increased thermal and acoustic insulation, and increased structural stiffness in the floor panels 204, 206, 206 of the exemplary embodiment of the flooring apparatus 200, according to the invention.

In embodiments of the floor apparatus 200, wherein the floor panels 204, 206, 206 include ribs of phenolic reinforced material extending between a first and a second skin of the floor panels 204, 206, 206, in the manner illustrated by the ribs 140 in FIGS. 2-4 for the first exemplary embodiment 100, the ribs will preferably be positioned to extend substantially perpendicularly across the shorter dimension of the spaces 212 within the support frame 202. In the flooring panels 202, 206, 206 of the exemplary embodiment of the flooring apparatus 200, for example, all ribs within the panels 204, 206, 206 would preferably be oriented in a substantially longitudinal direction parallel to the longitudinal side and middle rails 214, 216, 218.

The floor panels 204, 206, 206 may be attached to the support frame 202 by any appropriate method, or combination of methods. For example, the floor panels 204, 206, 206 may be adhesively bonded to the support frame with an adhesive, such as a moisture curing urethane. Alternatively, or in addition to adhesively bonding the floor panels 204, 206, 206 to the support frame 202, fasteners, such as screws, bolts, rivets, etc. may also be utilized for attaching the floor panels 204, 206, 206 to the support frame 202.

Figure 7A:
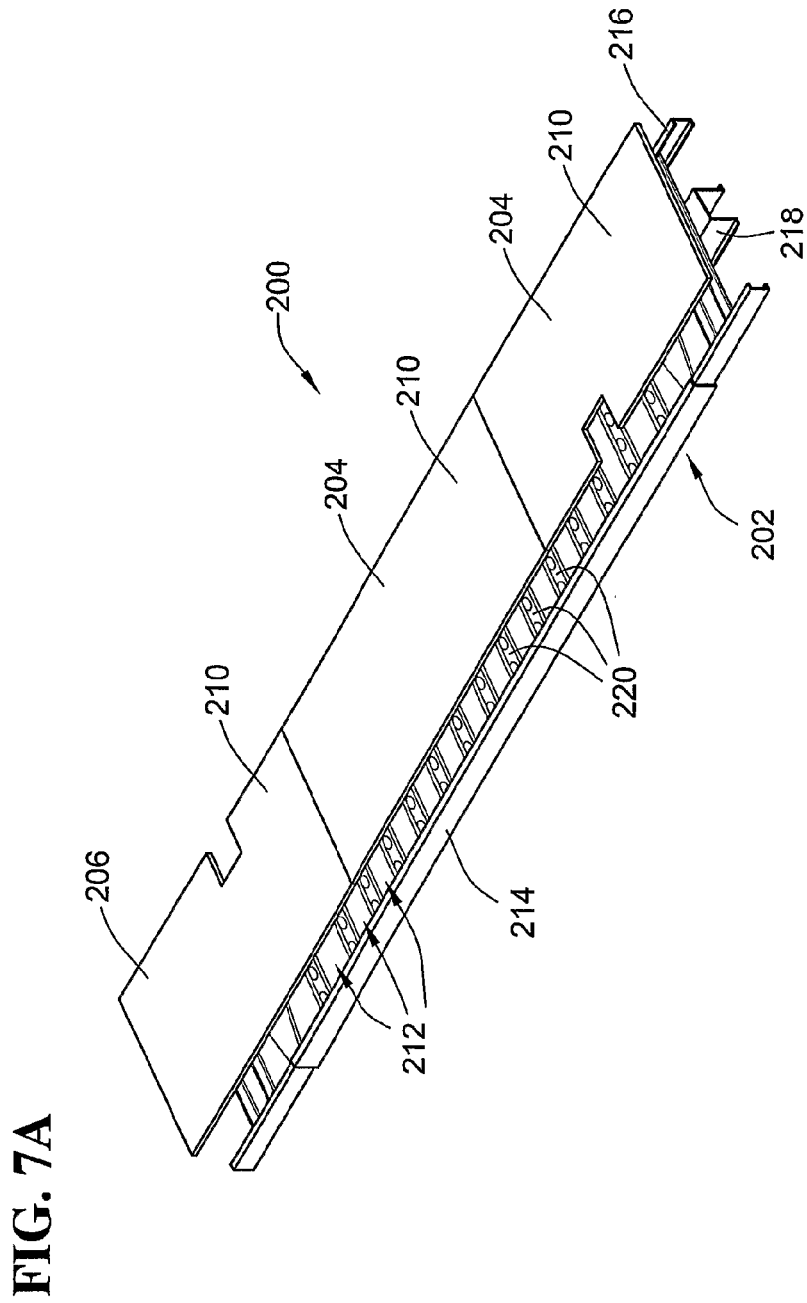
FIGS. 7A-7E are perspective, plan, and elevation views of a fire retardant panel apparatus, according to the invention, in the form of a flooring apparatus for a mass transit rail car.
Figure 7B:
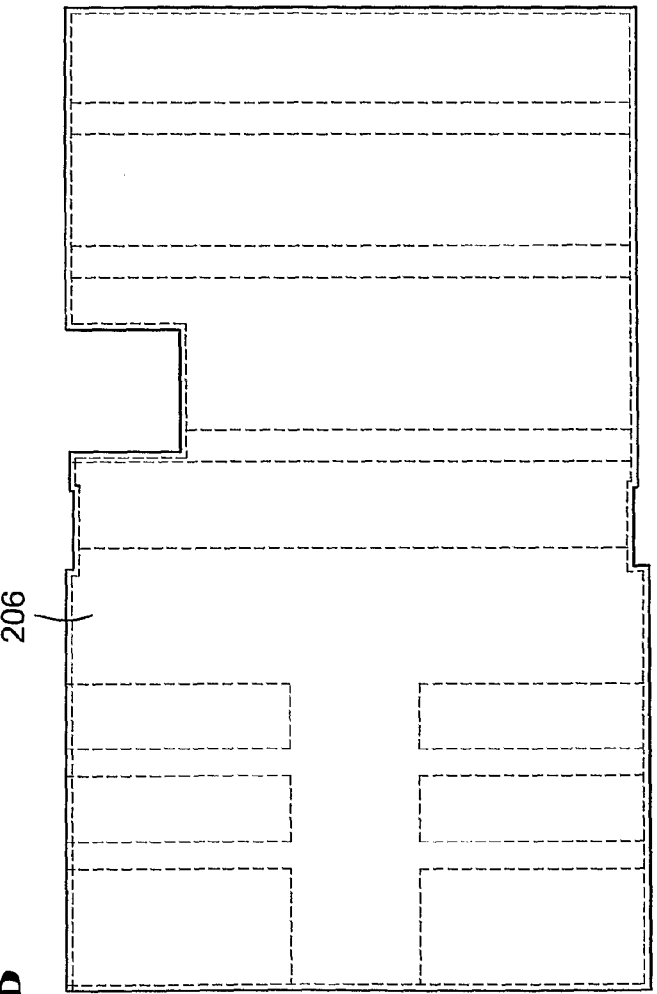
Figure 7C:
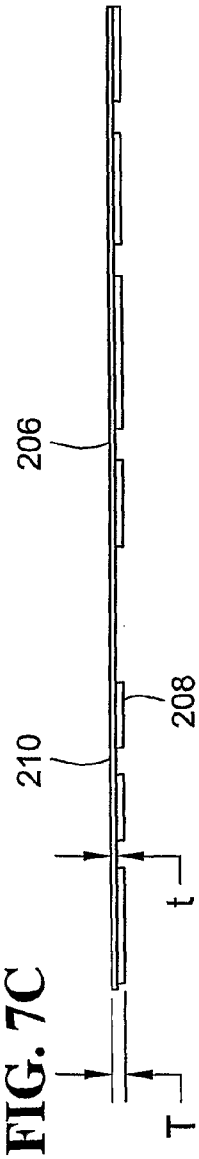
Figure 7D:
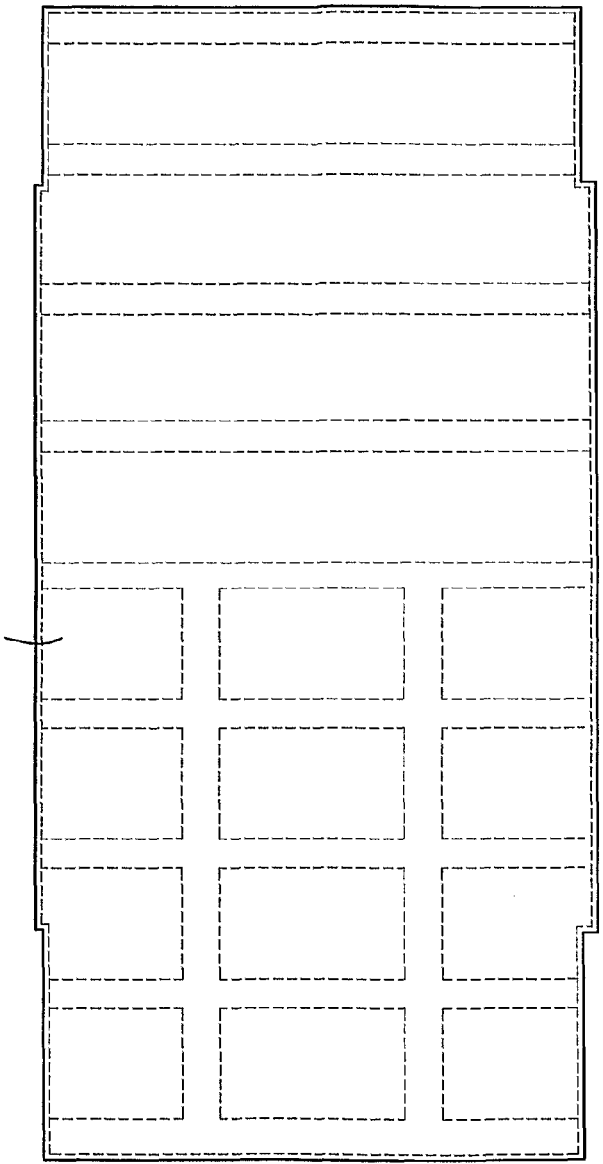
Figure 7E:
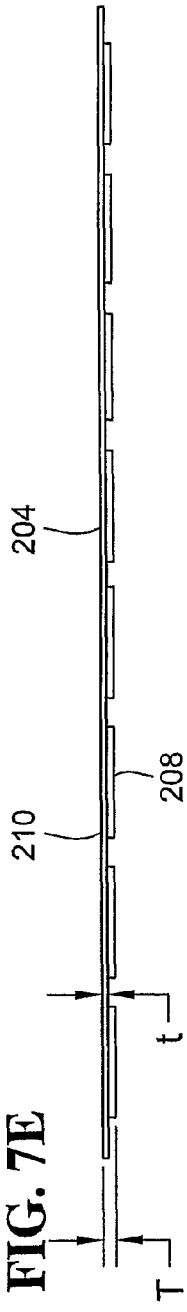
Figure 8C:
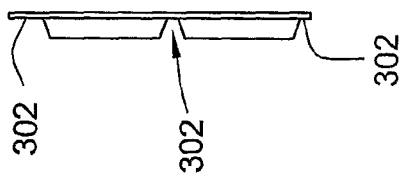
FIGS. 8A-8C are respectively top, bottom, and end views of an exemplary embodiment of a fire retardant floor panel, according to the invention, having sections of greater and lesser thickness to facilitate installation of the floor panel onto a support structure.
Figure 8B:
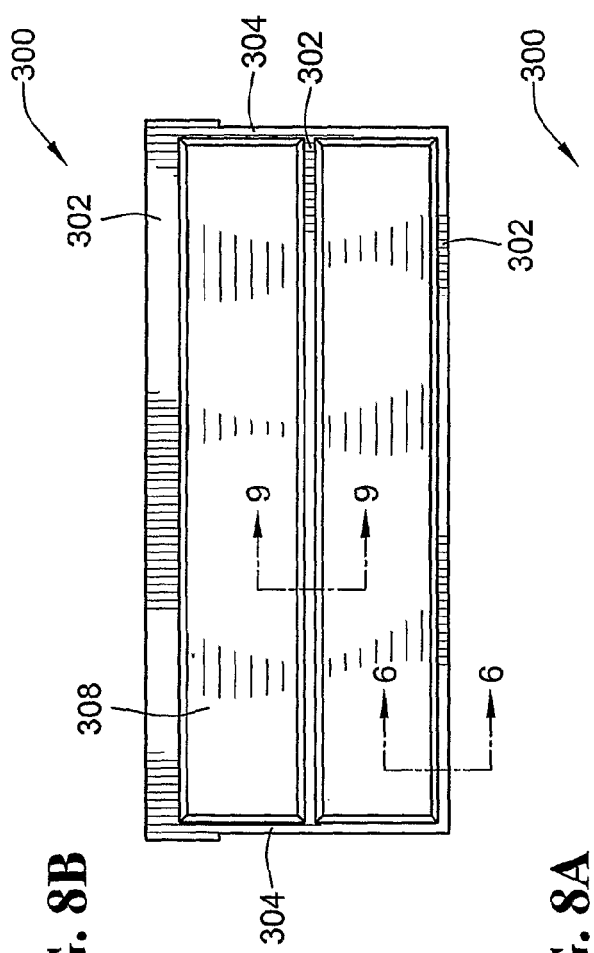
Figure 8A:
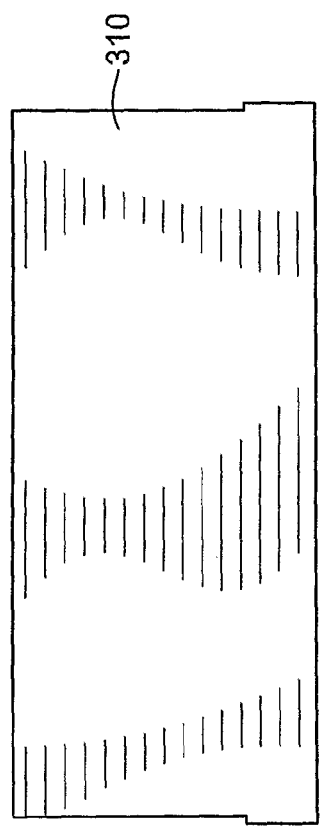

FIGS. 8A-8C illustrate another embodiment of a floor panel 300, for use in a flooring apparatus, according to the invention. The flame retardant floor panel 300 is configured for attachment to a support frame (not shown) of the type illustrated by the support frame 202 in FIG. 7A having a series of cross members which would be received in reduced thickness sections 302 of the panel 300. The panel 300 also includes additional reduced thickness sections 304 configured for resting upon longitudinal rails of a support frame, in the same manner as illustrated in FIG. 7A for the flooring apparatus 200. Through comparison of the drawings illustrating the flooring apparatus 200, and the flooring panel 300, it will be appreciated that whereas the flooring panels 204, 206, 206 of the flooring apparatus 200 had a major axis thereof oriented substantially longitudinally with respect to the support frame 200, the panels 300 are configured to have a major axis of the panels 300 oriented substantially transversely to the longitudinal axis of the support frame to which the panels 300 are attached.

Figure 9A:
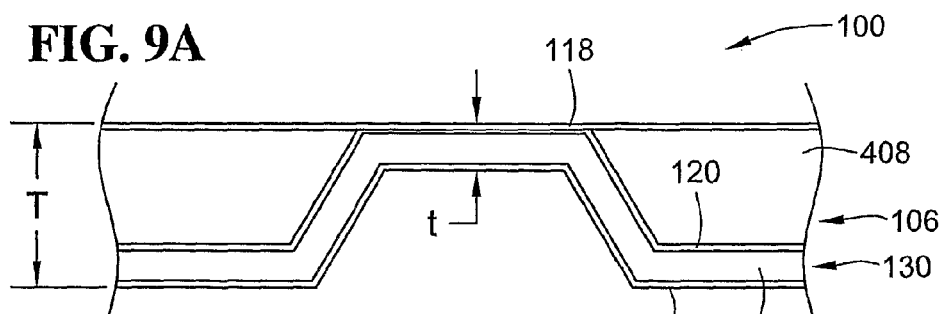
FIGS. 9A-9D are alternate partial cross-sectional views taken along line 9-9 in FIG. 8B, illustrating construction details of alternate embodiments of fire retardant panels, according to the invention, having areas of greater and lesser thickness located inwardly from the edges of the panel.
Figure 9B:
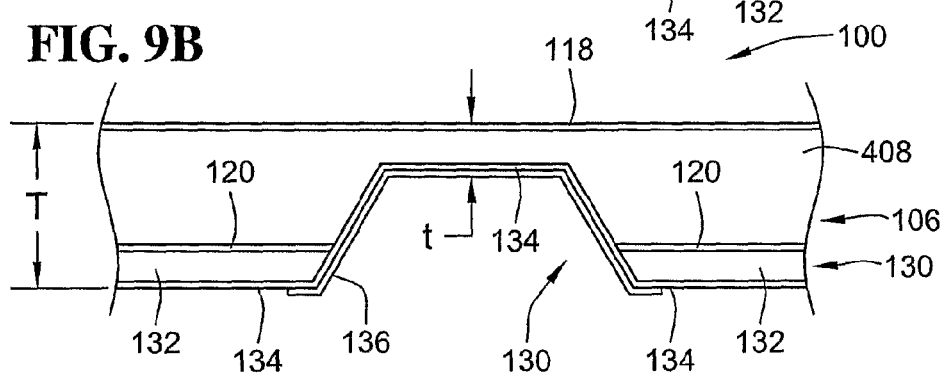
Figure 9C:
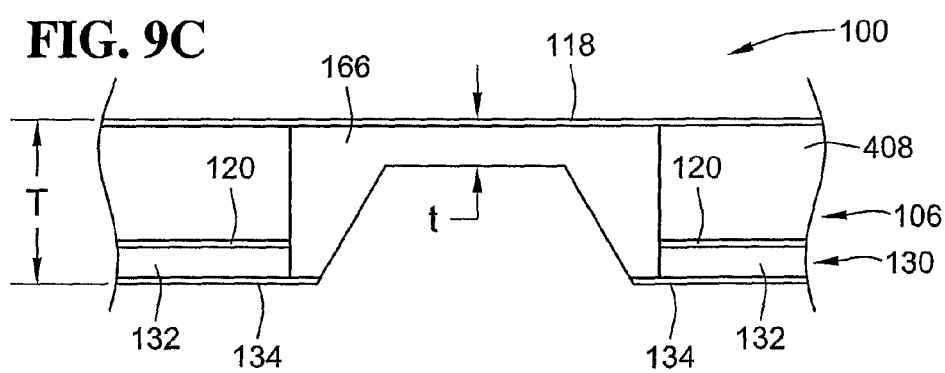
Figure 9D:
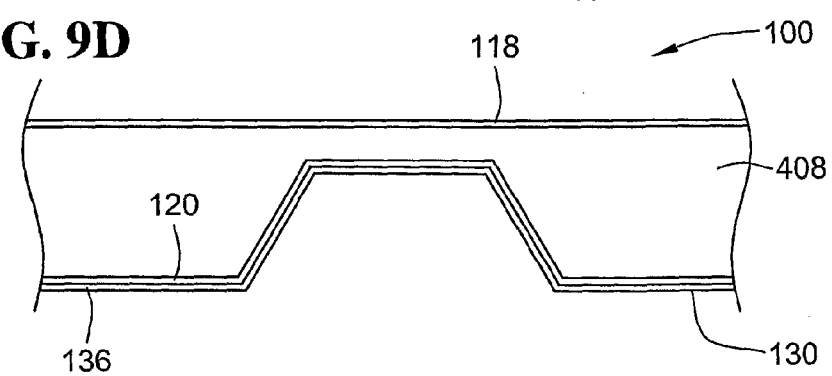

As shown in FIGS. 9A-9D where a flame retardant panel 100, according to the invention, includes sections of a first and a second thickness T, t, the layer of flame retardant material 130 may be different in the area of greater thickness T, than in the area of lesser thickness t. For example, as shown in FIG. 9B, where the flame retardant panel 100 is thicker, the layer of flame retardant material may be constructed in accordance with the embodiment illustrated in FIG. 2, while, in the areas of the exterior face in which the panel has a lesser thickness, the layer of flame retardant material 130 may be constructed in accordance with the embodiment illustrated in FIG. 4. In other embodiments of the invention, not having sections of differing thickness, the layer of flame retardant material may be constructed differently in various sections of the panel. Also, as indicated in FIG. 9C, where a panel 100, according to the invention, includes a reduced thickness section t disposed inwardly from the periphery 105 of the panel 100, the panel 100 may include a channel-shaped structure 166, of reinforced phenolic material, or another appropriate material.

Figure 10:
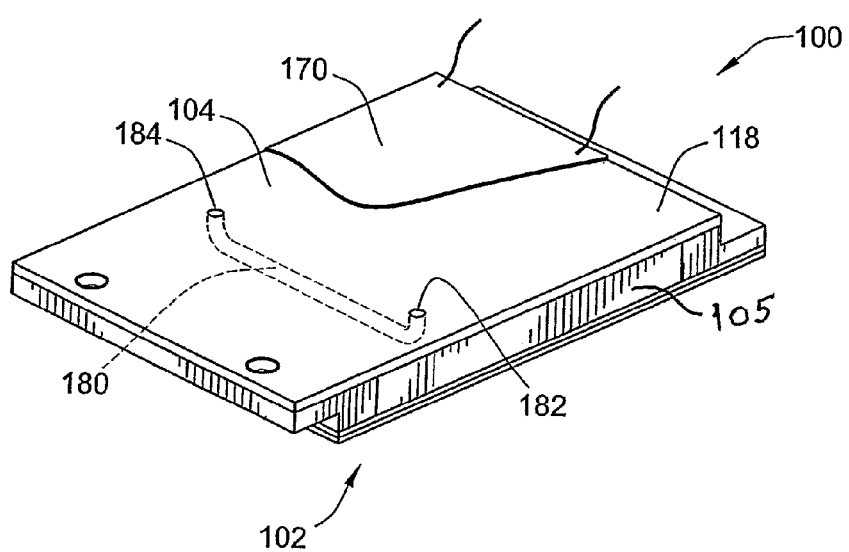
FIG. 10 illustrates alternate embodiments of the exemplary embodiment of the fire retardant panel shown in FIG. 1, wherein the alternate embodiments include a heating element attached to an interior surface of the panel, and a conduit disposed within the panel for passage of wires, or the like through the panel.

As shown in FIG. 10, a flame retardant panel 100, according to the invention, may include a heating element 170 attached to, or embedded into the first skin 118 of the panel, for providing heating of the interior surface of the panel.

As also shown in FIG. 10, a flame retardant panel 100, according to the invention, may also include one or more conduits 180 of plastic, metal composite, or pultruded composite, for example, embedded within the panel 100, and having first and second openings 182, 184 into the conduit 180, through at least one of the interior or exterior faces 102, 104 or the perimeter 105 of the panel.

FIGS. 11-17 illustrate heated panels 500A, 500B that may, but do not necessarily, incorporate particular features of the flame retardant panel 100 described above. Each of the heated panels 500A, 500B is a composite panel and may be constructed according to a method disclosed in U.S. Pat. No. 6,824,851, or a similar variation. However, each panel 500A, 500B further includes an embedded heated layer as described below.

Figure 11:
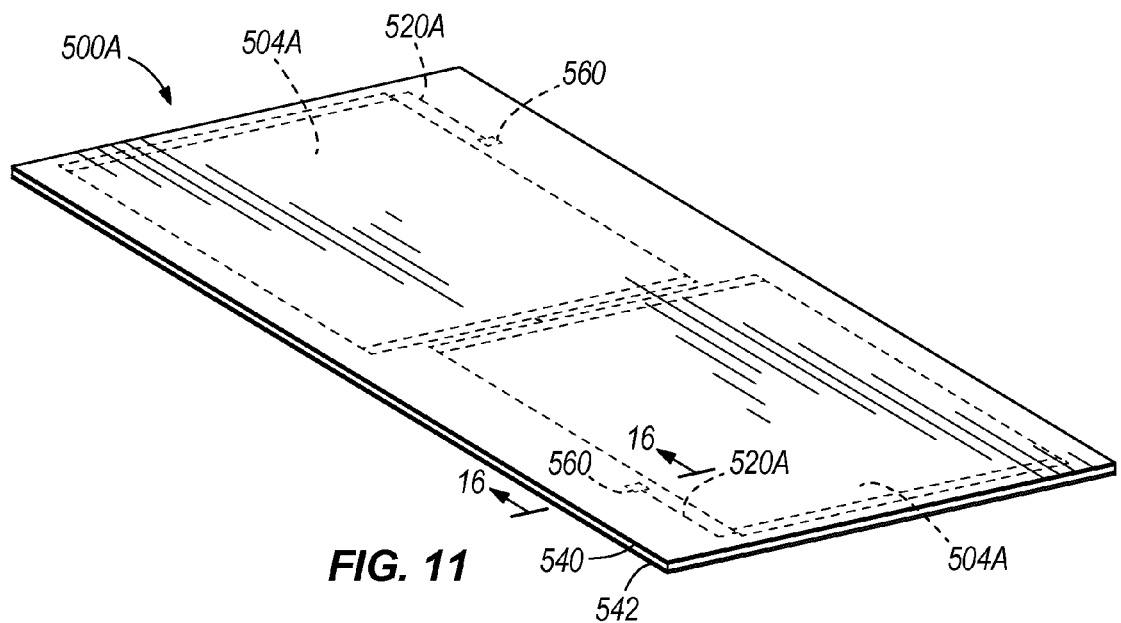
FIG. 11 is a perspective view of a heated panel, according to one construction.
Figure 12:
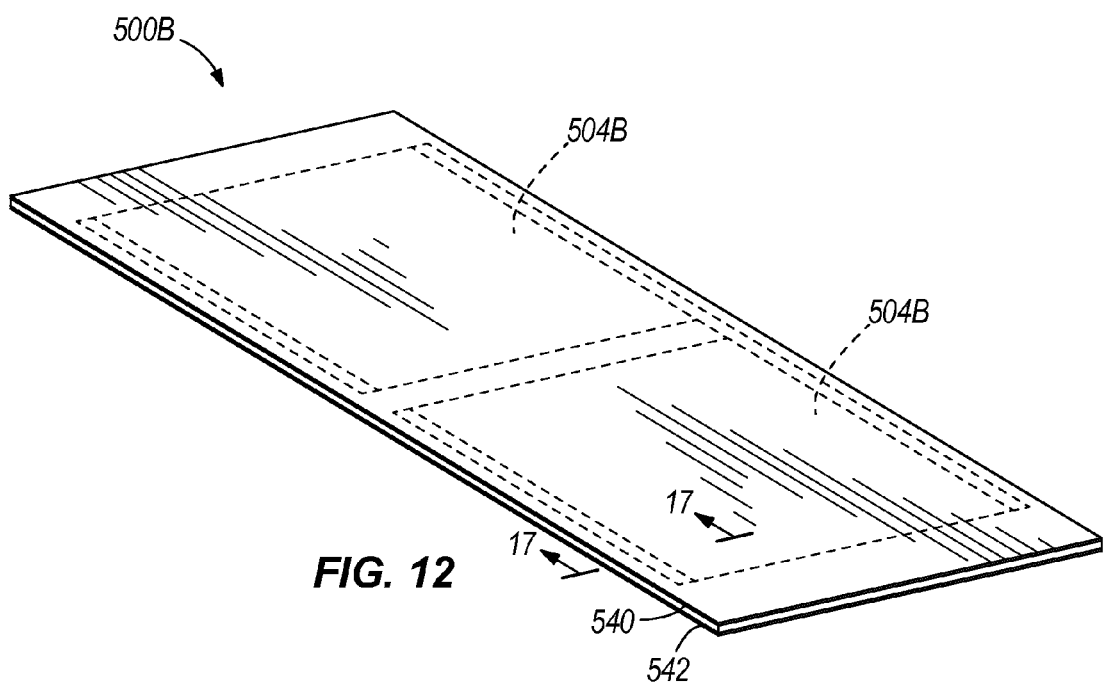
FIG. 12 is a perspective view of a heated panel, according to another construction.

With reference to FIGS. 11 and 12, each of the heated panels 500A, 500B includes a respective pair of heating elements 504A, 504B that cover a majority of each panel's plan view area. Each heating element 504A, 504B may include a resistive heating element, such as a woven sheet 508A, 508B including a plurality of strands of carbon fiber, extending between two opposed electrical buses (electrical buses 512A of the first heating elements 504A, and electrical buses 512B, 512B' of the second heating elements 504B). The weave pattern of the carbon fiber strands making up the sheets 508A, 508B may be a standard "basket" weave with one set of strands running parallel to the electrical buses 512A, 512B, 512B' and another set of strands being woven into the first set of strands perpendicularly, but other weaves are optional. The sheets 508A, 508B may be provided as pliable sheets constructed of raw carbon fiber material (i.e., unstructured or pre-cured, rather than rigid carbon fiber panels), or alternately, the sheets 508A, 508B can be provided as pre-cured, structured carbon fiber.

The sheets 508A, 508B may be constructed of any one of a number of different types of carbon fiber strands to provide each heating element 504A, 504B with a particular electrical resistance corresponding to the mass per unit area of the sheet. The size and/or type of carbon fiber strands in the woven sheets 508A, 508B may be selected from a plurality of available sizes and types based on the mass per unit area to achieve a desired electrical resistance for a particular installation. For example, the first sheet 508A may be woven from coarse-strand carbon fiber and have a mass per unit area of between about 280 g/m$^2$ and 320 g/m$^2$, and the second sheet 508B may be woven from fine-strand carbon fiber and have a mass per unit area of between about 180 g/m$^2$ and about 220 g/m$^2$. In one construction, the first sheet 508A is woven from coarse-strand carbon fiber having a mass per unit area of about 295 g/m$^2$, and the second sheet 508B is woven from fine-strand carbon fiber having a mass per unit area of about 192 g/m$^2$. However, woven carbon fiber sheets of other types, having other values of mass per unit area, can be used to achieve a particular desired result in the heating elements 504A, 504B. Furthermore, carbon fiber may be provided in alternate forms, including various woven or non-woven forms as described in some detail further below, to provide a resistive heating element.

Each electrical bus 512A, 512B of each heating element 504A, 504B may be constructed of two sheets or bars of an electrical conductor such as copper that sandwich an edge of the carbon fiber sheet and are fastened together. The sheets or bars that make up each of the electrical buses 512A, 512B may be coupled with mechanical fasteners (e.g., by screws, rivets, etc.) or alternately, may be coupled by bonding (e.g., by welding, brazing, adhesive, etc.). As shown in FIG. 11, the heating elements 504A of the first heated panel 500A are electrically coupled in series by coupling together one of the buses 512A of each heating element 504A with a connector wire 516. As shown in FIG. 12, the heating elements 504B of the second heated panel 500B are electrically coupled in series by providing one of the electrical buses 512B' as a common electrical bus for both heating elements 504B, and providing one electrical bus 512B on each heating element 504B that is not shared with the other heating element 504B. Each heated panel 500A, 500B further includes a pair of wires or electrical leads 520A, 520B that enable each panel 500A, 500B (and the heating elements 504A, 504B therein) to be coupled to an external voltage source. In the first panel 500A, one of the two leads 520A is coupled to each of the two electrical buses 512A that are not directly coupled by the connector wire 516. In the second panel 500B, one of the two leads 520B is coupled to the unique (non-shared) electrical bus 512B of each heating element 504B. If desired (e.g., to achieve a particular net electrical resistance for attaining a particular heat output, or to preserve operation of one heating element when another fails), the two heating elements 504A of the first panel 500A or the two heating elements 504B of the second panel 500B may alternately be coupled in parallel rather than series. It should also be noted that either of the heated panels 500A, 500B may be provided with a single heating element or more than two heating elements to cover a predetermined portion of the panel 500A, 500B, which may or may not be a majority depending upon the particular installation.

Another feature distinguishing the heated panels 500A, 500B of FIGS. 11 and 12 is that the electrical buses 512A of the first heating element 504A are arranged along the short edges of the rectangular carbon fiber sheet 508A, while the electrical buses 512B, 512B' of the second heating element 504B are arranged along the long edges of the rectangular carbon fiber sheet 508B. This illustrates another way, independent of carbon fiber strand size/weave variation, of varying the electrical resistance (and heat output for a given applied voltage) of the heating elements 504A, 504B without modifying the areas of the carbon fiber sheets 508A, 508B since electrical resistance varies proportionally with length and inversely proportionally with cross-sectional area. This enables a degree of modularization by enabling heating elements of a single size (plan view area) that can provide various heating outputs as necessary for a particular installation, or alternately, enables heating elements of a single size to be coupled to different voltage sources while outputting similar amounts or the same amount of heat. Furthermore, this promotes design flexibility in multi-panel floor constructions, for example, in which a plurality of heated panels may be coupled together and/or coupled to a common voltage source.

Figure 13:
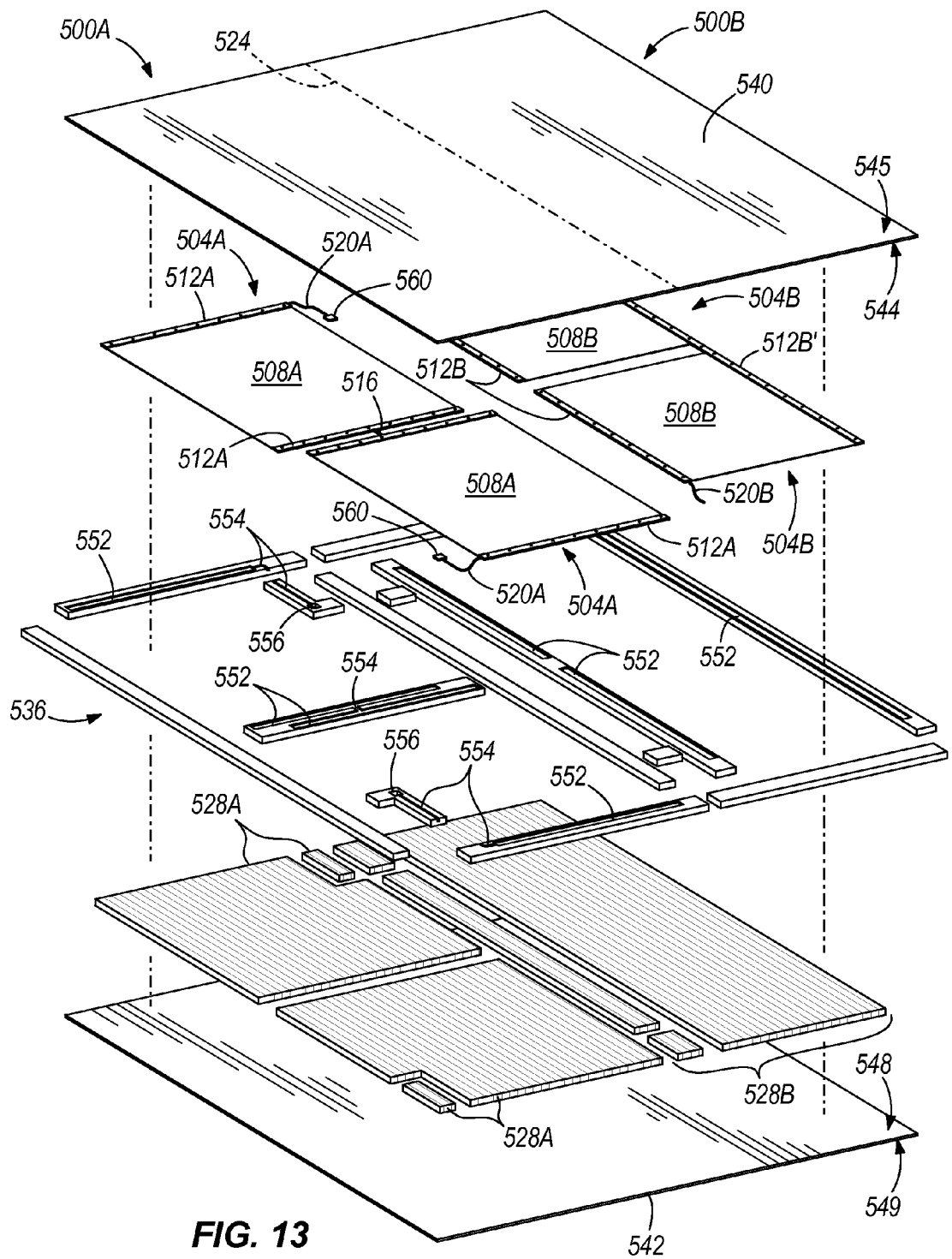
FIG. 13 is an exploded assembly view of the heated panels of FIGS. 11 and 12, which may be jointly constructed.
Figure 14:
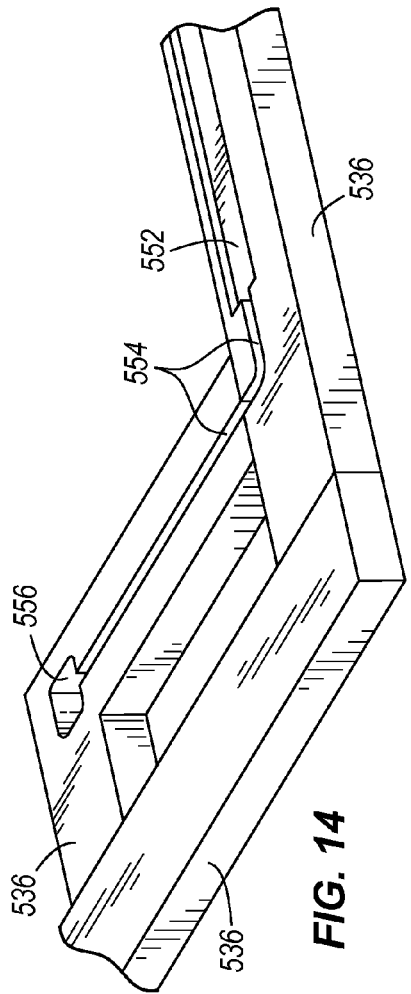
FIG. 14 is a detail view of a recessed pocket formed in a closeout of one of the heated panels shown in FIG. 13.
Figure 15:
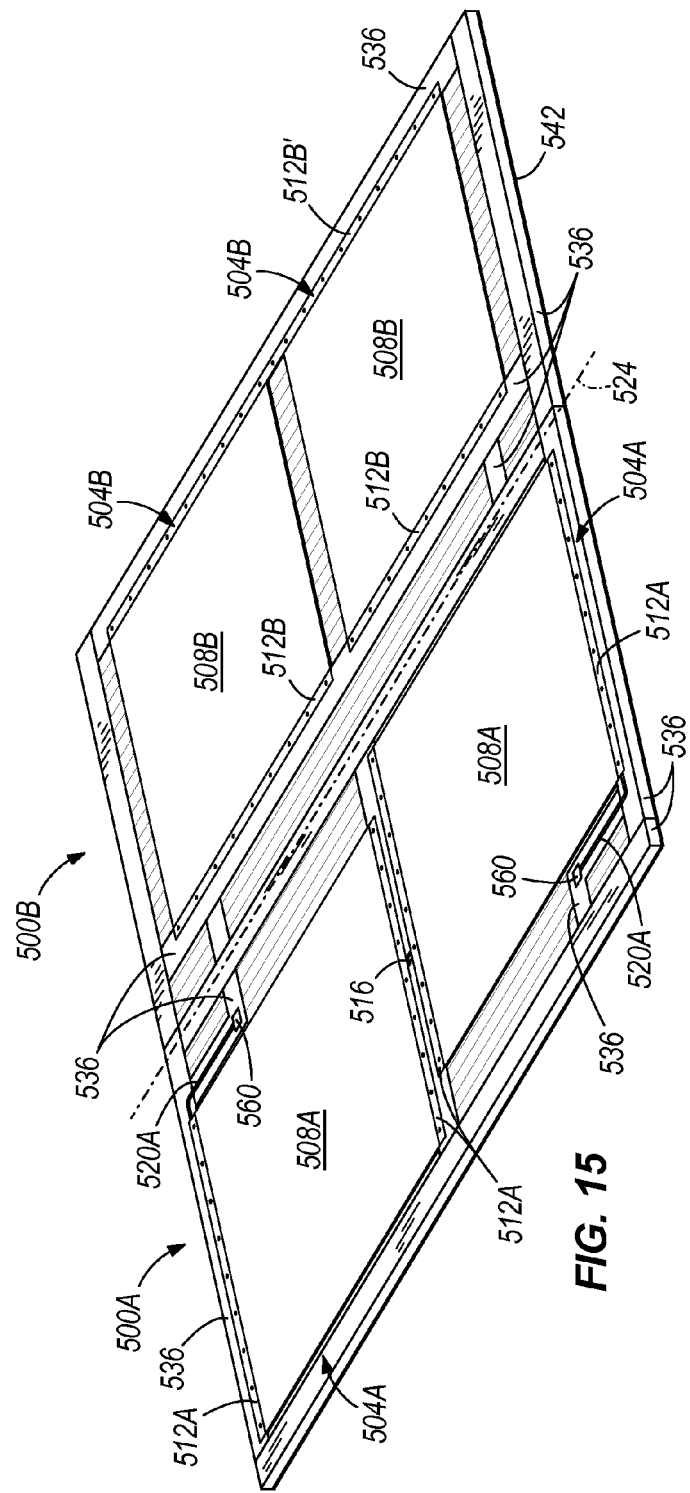
FIG. 15 is a perspective view of the jointly-constructed heated panels of FIGS. 11 and 12, with a first skin removed therefrom to illustrate the heating elements.

With reference to FIGS. 13-15, the construction of the panels 500A, 500B are described in further detail. Although not required, as shown in at least FIGS. 13 and 15, the two panels 500A, 500B of FIGS. 11 and 12 may be jointly constructed. If desired to separate the panels 500A, 500B, a cut along line 524 may be made after the panels 500A, 500B have cured. Each panel 500A, 500B includes a lightweight core 528A, 528B constructed of a low-density material that is strong in compression (e.g., foam, balsa wood, plywood, reinforced materials, or any combination thereof). In one construction, the cores 528A, 528B are precured reinforced cores constructed as disclosed in U.S. Pat. No. 6,824,851 to include a plurality of alternating foam strips 530 and precured phenolic resin ribs 532. A plurality of closeouts 536 are positioned adjacent or around each core 528A, 528B and define a periphery of each panel 500A, 500B. Some of the closeouts 536 are coupled to the respective cores 528A, 528B to directly surround the peripheries thereof. However, as shown in FIGS. 13 and 15, each of the panels 500A, 500B can optionally be segmented to include multiple cores 528A, 528B, and some of the closeouts 536 may define "interior" closeouts 536 that do not define the periphery of a panel 500A, 500B. The closeouts 536 can be constructed from higher density materials than the cores 528A, 528B such as blocks of reinforced phenolic material that is machineable as disclosed in U.S. Pat. No. 6,824,851. Like the cores 528A, 528B, the closeouts 536 are precured prior to the curing of a pair of skins 540, 542 that sandwich the cores 528A, 528B and the closeouts 536.

The cores 528A, 528B and the closeouts 536 are sandwiched between a first skin 540 and a second skin 542. If the two panels 500A, 500B are jointly constructed as shown, the skins 540, 542 are common to both panels 500A, 500B (until the finished panels 500A, 500B are finally cut apart). The first skin 540 includes a surface 544 that faces the cores 528A, 528B and an opposite surface 545 that faces away from the cores 528A, 528B and defines one face, an interior face, of the panels 500A, 500B. The second skin 542 includes a surface 548 that faces the cores 528A, 528B and an opposite surface 549 that faces away from the cores 528A, 528B and defines a second face, and exterior face, of the panels 500A, 500B. The core-facing surfaces 544, 548 of the first and second skins 540, 542 are bonded with the cores 528A, 528B and the closeouts 536, with the peripheral closeouts 536 forming a sealed panel boundary that inhibits intrusion of foreign material, such as water, into the interior and the cores 528A, 528B of the panels 500A, 500B. The outward face 545 of the first skin 540 may define an interior face of the panels 500A, 500B for defining an interior boundary of a compartment (e.g., the floor of a conveyance such as a train car, bus, elevator, etc.), and the outward face 549 of the second skin 542 may define an exterior face of the panels 500A, 500B for facing a support structure or frame that defines or surrounds the compartment.

The skins 540, 542 may be constructed of reinforced phenolic resin (e.g., fiberglass-reinforced phenolic resin) in some constructions.

As best shown in FIG. 14, some of the closeouts 536 may include one or more recessed pockets 552, 554, 556 for receiving portions of the heating elements 504A, 504B and associated wiring. For example, a first set of recessed pockets 552 are formed in certain ones of the closeouts 536 to receive each of the electrical buses 512A, 512B, 512B'. Each of the recessed pockets 552 has a plan view shape/area and a depth corresponding to the shape/area and the depth of a corresponding one of the electrical buses 512A, 512B, 512B'. Thus, the electrical buses 512A, 512B, 512B' do not present any substantial increase in the overall thickness of the panels 500A, 500B compared to non-heated panels. Thus, tooling for the manufacturer need not be specialized, and easy convertibility is provided for an end user between non-heated and heated panels. For example, the heated panels 500A, 500B may have an overall thickness of about 0.75 inches, which is equivalent to a standard overall thickness for conventional panels, such as non-heated floor panels, in certain industries. The carbon fiber sheets 508A, 508B may have a thickness that is significantly less than that of the electrical buses 512A, 512B, 512B', and thus, the carbon fiber sheets 508A, 508B may not need to be recessed to avoid substantial increase or deviation in the overall panel thickness. For example, the carbon fiber sheets 508A, 508B may have a thickness of about 0.010 inches to about 0.015 inches. If the carbon fiber sheets 508A, 508B have a significant enough thickness to warrant counteractive measures, the carbon fiber sheets 508A, 508B may be positioned exclusively over the cores 528A, 528B, which may have a reduced thickness compared to the closeouts 536. The difference in thickness between the cores 528A, 528B and the closeouts 536 may be about equal to the thickness of the carbon fiber sheets 508A, 508B so that a substantially uniform, flat receiving surface is created for the core-facing surface 544 of the first skin 540.

In addition to the recessed pockets 552 for the electrical buses 512A, 512B, 512B', recessed pockets or channels 554 are also formed in certain ones of the closeouts 536 to receive electrical wires coupled to the heating elements 504A, 504B, such as the connector wire 516 and the leads 520A, 520B. Similar to the recessed pockets 552 for the electrical buses 512A, 512B, 512B', the recessed pockets or channels 554 inhibit increase or deviation in the overall panel thickness due to the various electrical wires 516, 520A, 520B.

Figure 16:
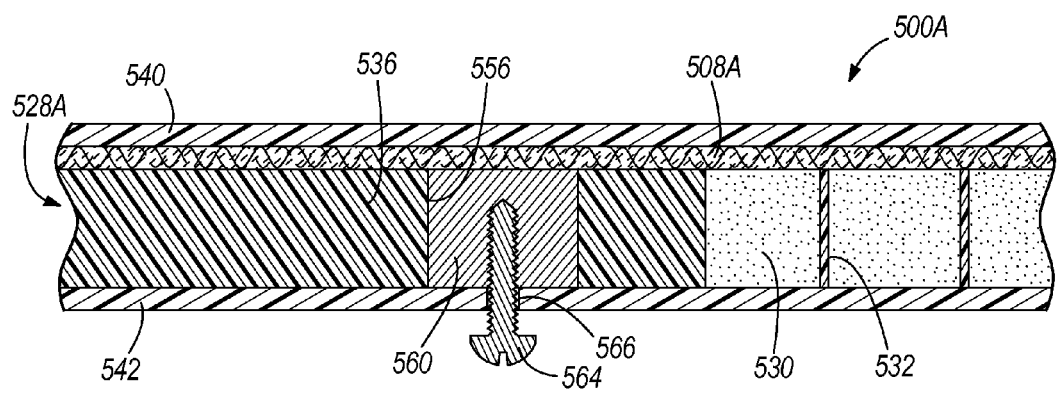
FIG. 16 is a cross-sectional view of an electrical terminal block of the heated panel of FIG. 11, taken through line 16-16 of FIG. 11.

With particular reference to FIGS. 14-16, additional recessed pockets 556 are provided in certain ones of the closeouts 536. The recessed pockets 556 are configured to receive electrically-conductive terminal blocks 560. The terminal blocks 560 are provided at the end of each of the leads 520A of the first heating elements 504A in the illustrated construction and may be constructed of a solid piece of copper in some constructions. The terminal blocks 560 are fully recessed into the recessed pockets 556 to inhibit increase or deviation in the overall panel thickness. As shown in FIG. 16, a terminal post 564 (e.g., a screw in the illustrated construction) may be engaged with each terminal block 560 to provide means for coupling the heating elements 504A with a voltage source. In the illustrated construction, each terminal post 564 is threaded into a drilled and tapped hole provided in the respective terminal block 560, and the terminal post 564 is configured to extend through an aperture 566 in the second skin 542 to protrude outwardly from the panel 500A. Although the terminal block 560 is shown with a thickness equivalent to that of the closeouts 536, the terminal block 560 may have a reduced thickness (e.g., about half or one-fourth the thickness of the closeouts 536), and in such constructions the terminal block 560 may be positioned adjacent the second skin 542, with an additional closeout block positioned over it, or the recessed pocket 556 may simply be provided with a smaller depth that is substantially equal to the thickness of the terminal block 560. The aperture 566 may be drilled after the panel 500A is cured. The panel 500A can alternately be provided with any desired type of connector or plug to couple the heating elements 504A with an external voltage source. Although not shown, the second panel 500B may have a similar arrangement.

Figure 17:
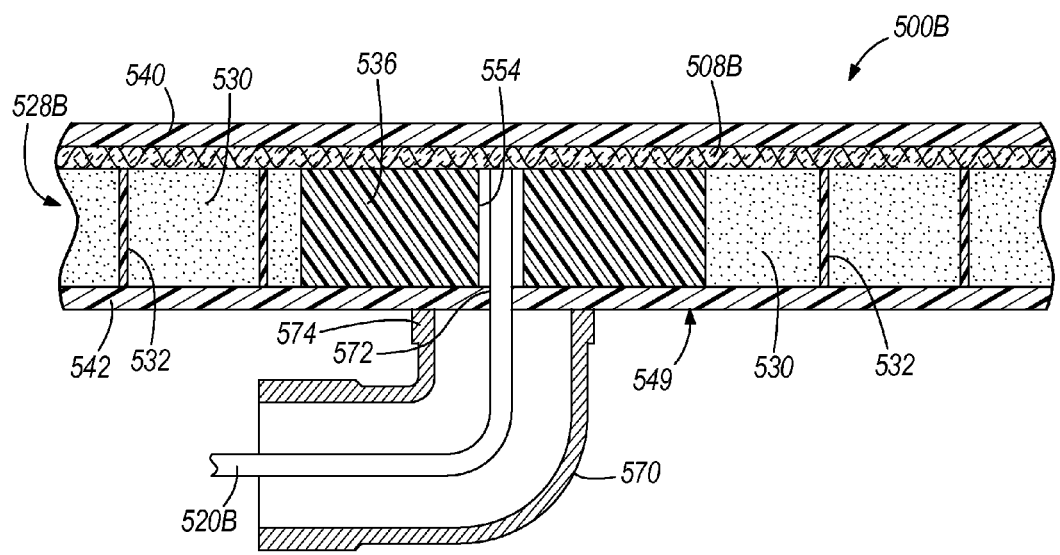
FIG. 17 is a cross-sectional view of a hollow wire fitting, taken through line 17-17 of FIG. 12.

FIG. 17 illustrates an alternate means for enabling electrical connection of the heating elements 504B to an external voltage source. In the construction of FIG. 17, the electrical leads 520B are provided with sufficient length to extend outwardly from the panel 500B. In order to facilitate passage of the leads 520B outward from the panel 500B, a hollow fitting 570 is coupled to the outward-facing surface 549 of the second skin 542 at a location 572 where the electrical leads 520B pass through the second skin 542. The location 572 at which each electrical lead 520B passes through the second skin 542 may be in communication with one of the recessed wire channels 554, which may be formed directly within a recessed pocket 552 that receives an electrical bus 512B, 512B'. In the illustrated construction, the hollow fitting 570 is a 90-degree "elbow" fitting, which may be coupled to the second skin 542 with adhesive, although other suitable attachment means, such as mechanical fasteners, may also be utilized. In the illustrated construction, the hollow fitting 570 includes a flange 574 provided for direct coupling to the exterior face of the panel 500A provided by the surface 549 of the second skin 542. Although not shown, the first panel 500A may have a similar arrangement.

It should be noted that the layers shown in the cross-sectional views of FIGS. 16 and 17 are not necessarily to scale, and represent only one possibly layering scheme. For example, each of the carbon fiber sheets 508A, 508B is shown to occupy a discrete and substantial space between the core 528A, 528B and the first skin 540. However, the carbon fiber sheets 508A, 508B may actually be substantially thinner than the first skin 540. Furthermore, the carbon fiber sheets 508A, 508B may not be positioned between the core 528A, 528B and the core-facing surface 544 of the first skin 540, but may be embedded within the first skin 540 to lie between the two surfaces 544, 545 of the first skin 540 by wetting out the carbon fiber sheets 508A, 508B with liquid resin (e.g., fiberglass reinforced phenolic resin) that is later cured to form the solid resin skin 540 with the carbon fiber sheets 508A, 508B encased therein. In such a construction, a manufacturing method may include applying a first liquid phenolic resin layer onto the face of the core 528A, 528B that is to receive the first skin 540, placing the carbon fiber sheets 508A, 508B of the heating elements 504A, 504B into the first liquid phenolic resin layer, and then applying a second liquid phenolic layer onto the carbon fiber sheets 508A, 508B. One or more reinforcing layers (e.g., fiberglass mat) may also be provided on top of and below the carbon fiber sheets 508A, 508B and saturated with liquid phenolic resin. Upon curing of the liquid phenolic resin (e.g., by heat and pressure), a unitary skin 540 is formed that contains the carbon fiber sheets 508A, 508B between its surfaces 544, 545. The liquid phenolic resin of the first and second skins 540, 542 also form strong bonds with the phenolic ribs 532 of the cores 528A, 528B during the curing process so that the various layers are unitized into a solid composite panel structure. Alternate constructions may also be employed for the positioning of the heating elements 504A, 504B. For example, the heating elements 504A, 504B (and particularly the carbon fiber sheets 508A, 508B) may even be provided on an outward surface of the panel 500A, 500B such as on the surface 545 of the first skin 540, and may be applied to the first skin 540 after the curing thereof. Whether above, below, or inside the first skin 540, and whether applied before or after curing of the first skin 540, all of the above examples of specific positions of the heating elements 504A, 504B are considered to position the heating elements 504A, 504B adjacent the interior face 545 of the panel 500A, 500B to facilitate ample heating to the interior side of the panel 500A, 500B.

Figure 18:
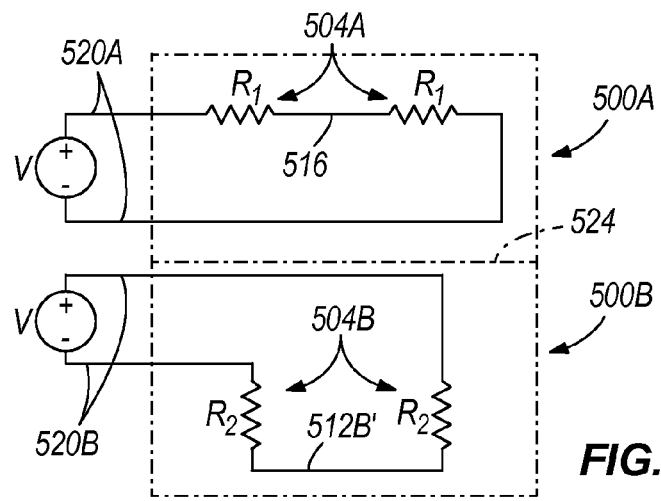
FIG. 18 is a schematic diagram illustrating the heating elements of the heated panels of FIGS. 11 and 12 coupled to voltage sources.

Electrical schematics showing the heating elements 504A, 504B of the respective panels 500A, 500B are illustrated in FIG. 18. Although shown together in FIG. 18 for convenience, the panels 500A, 500B may be separated from each other along line 524 to permit separate installation as mentioned above. The heating elements 504A of the first panel 500A are each shown schematically as a resistance R1, and the heating elements 504B of the second panel 500B are each shown schematically as a resistance R2. Similar voltage sources having a first voltage V are illustrated as being applied to each set of heating elements 504A, 504B. If the resistance R1 of each first heating element 504A and the resistance R2 of each second heating element 504B are substantially equivalent, then a substantially equivalent electrical current will flow through each set of heating elements 504A, 504B, and substantially equivalent heating is provided to each of the panels 500A, 500B. However, the resistances R1, R2 are different in some constructions due to at least one of: the type of material of the sheets 508A, 508B and the physical arrangement of each sheet 508A, 508B between its respective electrical buses, both of which can cause a change in both resistance and electrical current, and thus heat output.

As shown in the drawings, the heating elements 504A, 504B cover a majority but less than entire panel area. However, it should be realized that virtually any desired configuration can be achieved with respect to the necessary heat density and heated area for a particular panel. For example, some panels may only have certain designated portions used to define a heated passenger compartment, for example, and thus heating is only provided at those particular locations. In other constructions, the size of the heating elements 504A, 504B may be substantially equal to the entire area of the panel(s) 500A, 500B. In further constructions, the first skin 540 may achieve a substantially uniform elevated temperature at the interior face 545 even though the heating elements 504A, 504B do not cover the entire panel area.

Figure 19:
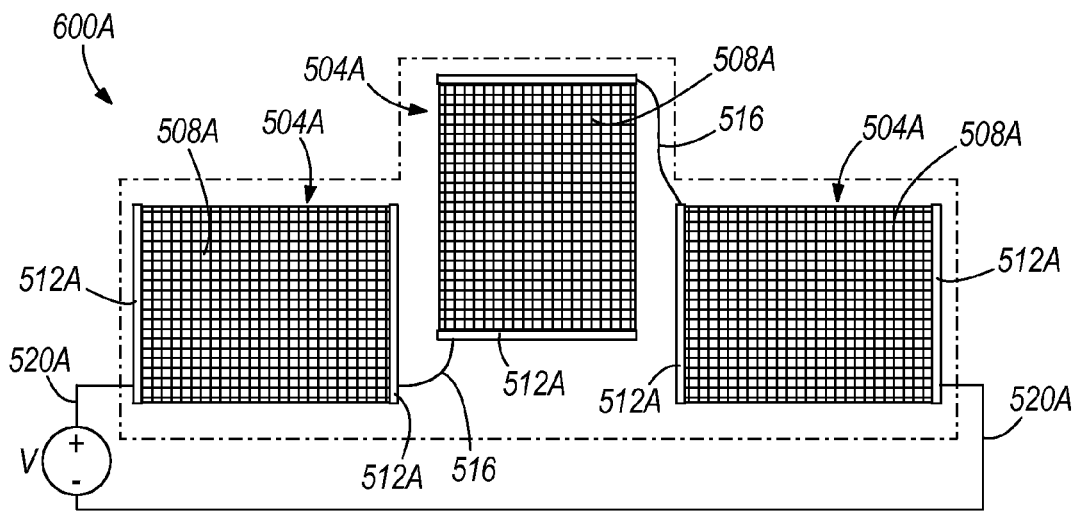
FIG. 19 is a schematic panel layout illustrating an arrangement of multiple, series-connected carbon fiber heating elements of a first type in a heated panel.
Figure 20:
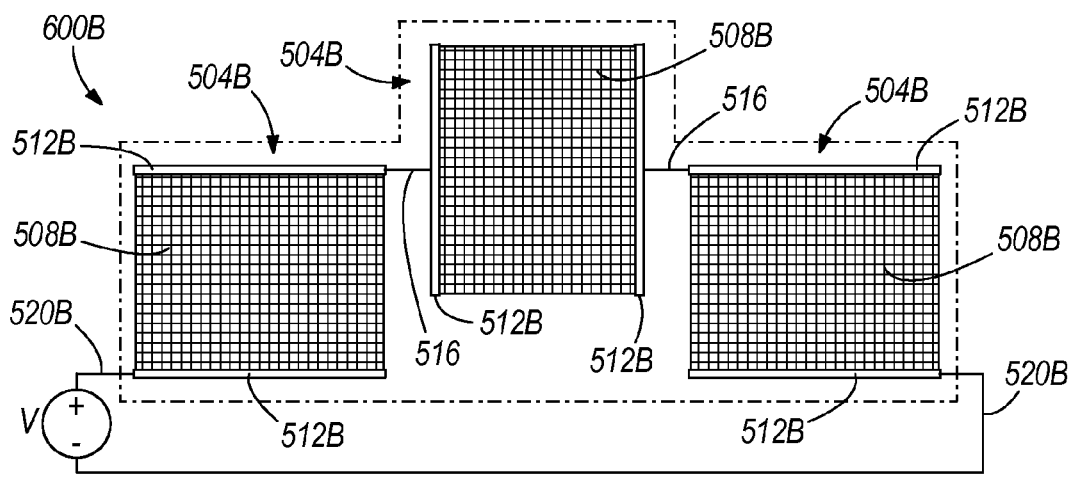
FIG. 20 is a schematic panel layout illustrating an arrangement of multiple, series-connected carbon fiber heating elements of a second type in a heated panel.

FIGS. 19 and 20 schematically illustrate layouts for panels 600A, 600B that utilize more than two heating elements 504A, 504B each. FIG. 19 illustrates a generally "T" shaped panel 600A in which three heating elements 504A are provided to cover a majority of the area of the panel 600A. The panel 600A can have the basic construction described above. As with the panel 500A of FIG. 11, the heating elements 504A include electrical buses 512A provided across each minor dimension of the rectangular carbon fiber sheets 508A. The three heating elements 504A are coupled in series via connecting wires 516 between adjacent electrical buses 512A. The panel 600B of FIG. 20 is substantially identical to the panel 600A of FIG. 19, except for the structure and connection of the heating elements 504B. As with the panel 500B of FIG. 12, the heating elements 504B include electrical buses 512B provided across each major dimension of the rectangular carbon fiber sheets 508B. The three heating elements 504B are coupled in series via connecting wires 516 between adjacent electrical buses 512B. The central heating element 504A, 504B in each panel 600A, 600B has a rotational orientation that is 90-degrees offset from the two remaining heating elements 504A, 504B in each panel 600A, 600B.

As shown by the discrepancy in line weight in FIGS. 19 and 20, the carbon fiber sheets 508A in the first panel 600A are formed from coarser or heavier carbon fiber than the sheets 508B in the second panel 600B. Therefore, the carbon fiber of the first sheets 508A has substantially less electrical resistance. However, because the two electrical buses 512B of each of the second heating elements 504B are placed closer together than the electrical buses 512A of each of the first heating elements 504A, the net resistance of each heating element 504B of the second panel 600B may be substantially equivalent to the net resistance of each heating element 504A of the first panel 600A. To make a heating element with a lower resistance than the illustrated heating elements 504A, 504B, a coarse carbon fiber such as that of the sheets 508A may be used with the bus configuration shown in FIG. 20. To make a heating element with a higher resistance than the illustrated heating elements 504A, 504B, a fine carbon fiber such as that of the sheets 508B may be used with the bus configuration shown in FIG. 19. Options for constructing and arranging one or more heated panels may further include providing one or more of any of the described heating elements in a single panel, or in multiple electrically-connected panels, and connecting the various heating elements and the various panels in parallel or in series with one or multiple voltage sources.

Figure 21:
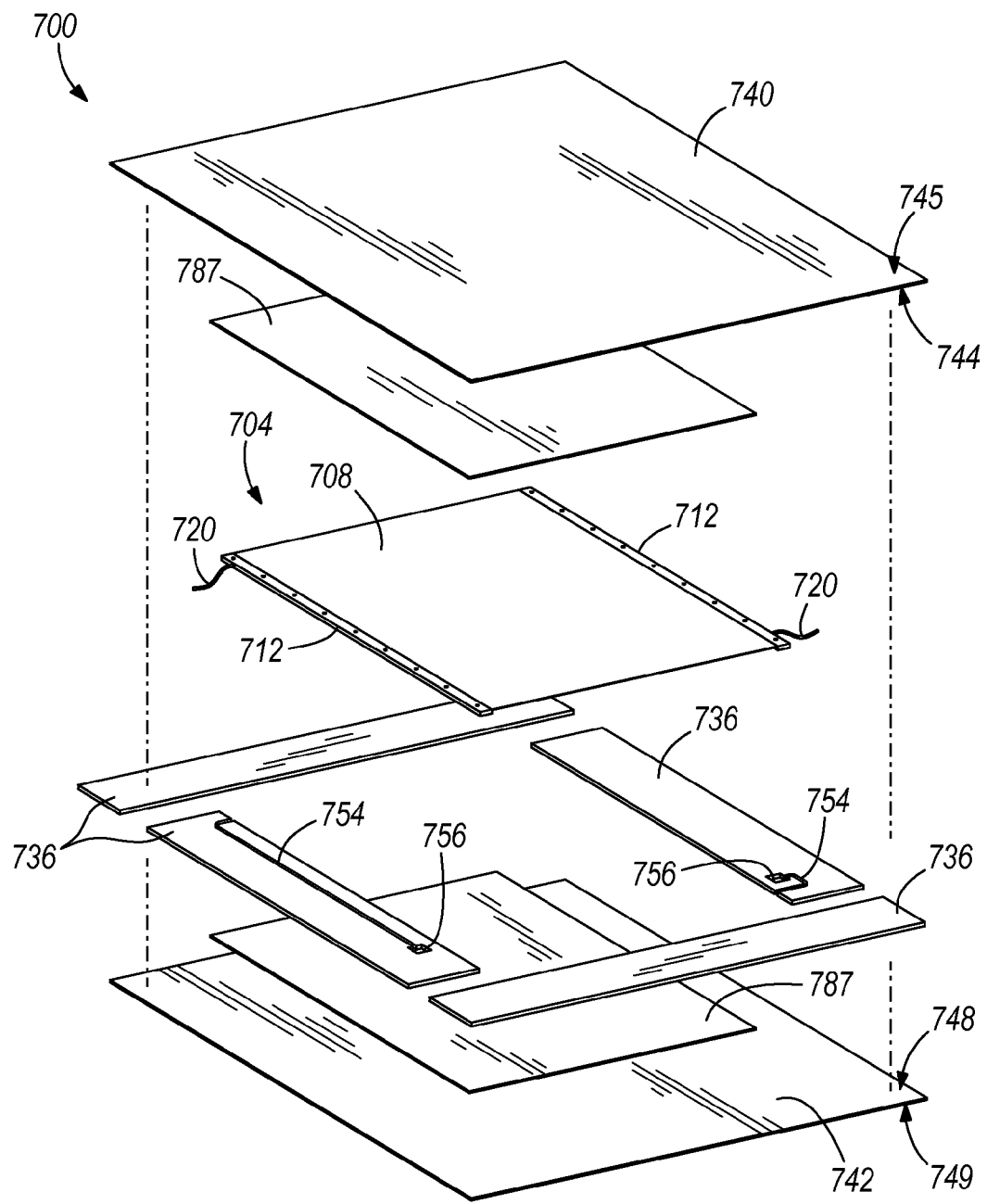
FIG. 21 is an exploded assembly view of a heated panel in which the heating element forms the core.

FIG. 21 illustrates yet another heated panel 700. The panel includes a first skin 740, a second skin 742, and a plurality of closeouts 736, all of which may be substantially similar to the corresponding features of the panels 500A, 500B described above. The panel 700 includes a heating element 704 similar to the heating element 504B described above, but variations of the heating element 704 are certainly contemplated. In the illustrated construction, the heating element 704 includes a sheet 708 of woven carbon fiber strands extending between two opposed electrical buses 712, each having an electrical lead 720 extending therefrom for connection to a voltage source (not shown). As described with respect to the electrical buses 512A, 512B, 512B' of the panels 500A, 500B, the electrical buses 712 have a thickness substantially greater than a thickness of the carbon fiber sheet 708. Rather than provide recessed pockets for receiving the electrical buses 712, the panel 700 is provided without any conventional core whatsoever, and a pair of ancillary reinforcement layers 787 (e.g., fiberglass mats) are placed above and below the carbon fiber sheet 708, but not over the electrical buses 712, to provide flush faces for the surfaces 744, 748 of the first and second skins 740, 742 to abut. In the construction of FIG. 21, the overall thickness of the panel 700 between the outer skin surfaces 745, 749 may be substantially thinner than that of the panels 500A, 500B (e.g., about 0.25 inches compared to about 0.75 inches). The panel 700 may be considered "coreless" with respect to a conventional core, but the heating element 704 and the ancillary reinforcement layers 787 may be considered to provide a panel core. As with the closeouts 536 described above, the closeouts 736 of the panel 700 can include recessed channels 754 for the electrical leads 720 and/or recessed pockets 756 for electrical terminal blocks (not shown).

Figure 22:
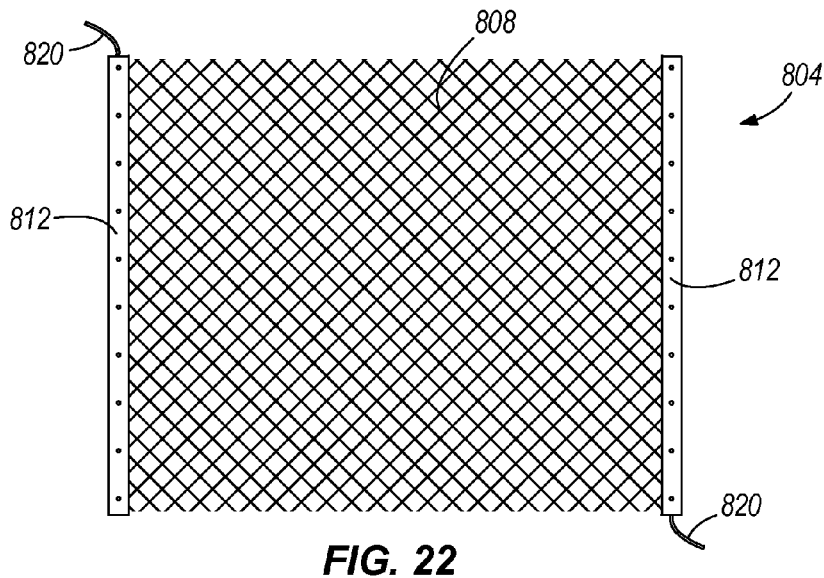
FIG. 22 is a top view of a carbon fiber heating element having a diamond weave.

FIG. 22 illustrates a heating element 804 having an alternate construction from the heating layers 504A, 504B, 704 described above. As opposed to a 90-degree basket weave having one set of strands parallel to the electrical buses and another set perpendicular to the electrical buses, the sheet 808 of the heating element 804 of FIG. 22 is provided with a diamond weave in which all of the carbon fiber strands run at substantially 45-degree angles with respect to the electrical buses 812. As with the other heating elements discussed above, the heating element 804 includes an electrical lead 820 extending from each electrical bus 812 to facilitate connection to an external voltage source. Although FIG. 22 illustrates one possible construction, it should be understood that other types of diamond or non-diamond patterns may also be used.

Figure 23:
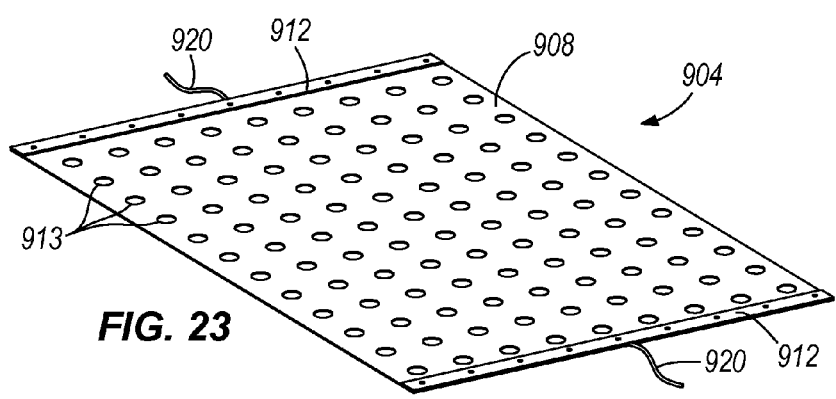
FIG. 23 is a perspective view of a carbon fiber film heating element.
Figure 24:
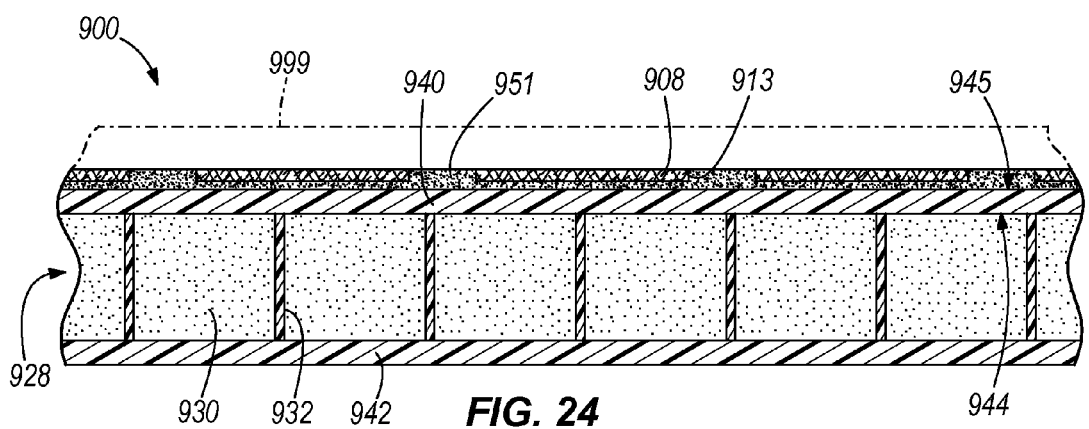
FIG. 24 is a cross-sectional view of the carbon fiber film heating element of FIG. 23 bonded to the outside surface of the first skin of a composite panel.

FIG. 23 illustrates yet another type of heating element 904 for use in constructing a heated panel 900 (FIG. 24). The heating element 904 includes a resistive carbon fiber membrane or film 908, rather than a woven fabric-like sheet. The carbon fiber film 908 may be a composite film such as a thin, closed and fiber-reinforced PET film with integrated copper electrical buses 912. The carbon fiber film 908 may have a thickness less than about 0.5 mm. The film 908 may also be provided with a plurality of apertures or perforations 913. Although the film 908 of FIG. 23 can be incorporated into a composite panel in a manner similar to those described above, FIG. 24 illustrates one particularly unique means for constructing a heated composite panel 900.

Similar to other panels described above, the panel 900 includes first and second skins 940, 942 and a core 928 (e.g., of foam strips 930 and precured phenolic ribs 932) therebetween. However, FIG. 24 illustrates that the heating element 904 may be positioned on a surface 945 of the first skin 940 opposite a core-facing surface 944. In some constructions, the heating element 904 may be bonded to the surface 945 of the first skin 940 with an adhesive 951. Thus, the heating element 904 forms an outward surface of the panel 900 as a whole. The surface 945 of the first skin 940 receiving the heating element 904 may be an interior surface of the panel 900 used to define the interior boundary of a compartment. In order to cover the heating element 904 and inhibit damage thereto which may otherwise occur by foot traffic or other means, an additional covering, such as a flooring mat 999, may be placed over the panel 900.

As mentioned briefly above, a plurality of heated composite panels, according to any construction described herein, may be used together in defining a floor structure of a conveyance, such as a train, bus, elevator, etc. The heating elements provided in all of the plurality of heated panels or a designated group of heated panels may be coupled together in parallel or in series with a common voltage source. Each heated panel or group of heated panels may also be coupled with unique voltage sources, which may provide substantially equivalent voltages, different voltages, or adjustable voltages.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A panel having an exterior face thereof adapted for attachment to a support frame and an interior face thereof adapted for defining a boundary of a compartment, the panel comprising:
   a core encapsulated within a panel frame of reinforced phenolic material, the core having first and second faces thereof, and a periphery thereof, the panel frame including first and second skins attached to the first and second faces of the core;
   one or more closeouts disposed between the skins about the periphery of the core, with the one or more closeouts being attached to the first and second skins; and
   a heating element adjacent the interior face of the panel, wherein the heating element is embedded into the first skin of the panel, and integrally joined thereto by the reinforced phenolic material.

2. The panel of claim 1, wherein the heating element is a resistive heating element including electrically-conductive carbon fiber strands.

3. The panel of claim 2, wherein the heating element includes a plurality of carbon fiber strands extending between two opposed electrical buses.

4. The panel of claim 3, wherein the plurality of carbon fiber strands are woven together in a diamond pattern.

5. The panel of claim 3, wherein each one of the electrical buses includes a pair of copper plates that sandwich a corresponding end of each of the plurality of carbon fiber strands.

6. The panel of claim 3, wherein the primary core has a first thickness, the plurality of carbon fiber strands has a second thickness, and the one or more closeouts has a third thickness, the third thickness being about equal to the sum of the first thickness and the second thickness and defining a distance between the first and second skins.

7. The panel of claim 6, wherein the electrical buses have a thickness greater than the second thickness, and the electrical buses are received in recessed pockets of the one or more closeouts.

8. The panel of claim 7, further comprising a pair of electrical wires coupled to the electrical buses for introducing a voltage across the heating element, wherein the electrical wires are positioned in recessed pockets of the one or more closeouts.

9. The panel of claim 8, wherein the one or more closeouts including the recessed pockets include one or more machineable phenolic blocks.

10. A panel having an exterior face thereof adapted for attachment to a support frame and an interior face thereof adapted for defining a boundary of a compartment, the panel comprising:
- a core encapsulated within a panel frame of reinforced phenolic material, the core having first and second faces thereof, and a periphery thereof, the panel frame including first and second skins attached to the first and second faces of the core;
- one or more closeouts disposed between the skins about the periphery of the core, with the one or more closeouts being attached to the first and second skins;
- a heating element adjacent the interior face of the panel;
- a pair of opposed electrical buses positioned at opposing ends of the heating element; and
- a pair of electrical wires coupled to the electrical buses for introducing a voltage across the heating element, wherein each of the pair of electrical wires terminates at a corresponding electrically-conductive terminal block, each of the terminal blocks being received in a corresponding recessed pocket, wherein a terminal post is positioned in each of the terminal blocks and protrudes outwardly from the panel for connecting the heating element to a voltage source.

11. The panel of claim 10, wherein the recessed pockets receiving the terminal blocks are formed in the one or more closeouts.

12. A panel having an exterior face thereof adapted for attachment to a support frame and an interior face thereof adapted for defining a boundary of a compartment, the panel comprising:
- a core encapsulated within a panel frame of reinforced phenolic material, the core having first and second faces thereof, and a periphery thereof, the panel frame including first and second skins attached to the first and second faces of the core;
- one or more closeouts disposed between the skins about the periphery of the core, with the one or more closeouts being attached to the first and second skins;
- a heating element adjacent the interior face of the panel;
- a pair of opposed electrical buses positioned at opposing ends of the heating element;
- a pair of electrical wires coupled to the electrical buses for introducing a voltage across the heating element; and
- a pair of hollow fittings coupled to the exterior face of the panel, each of the hollow fittings providing a conduit through which a corresponding one of the pair of electrical wires passes and extends away from the exterior face for connection to a voltage source.

13. A panel having an exterior face thereof adapted for attachment to a support frame and an interior face thereof adapted for defining a boundary of a compartment, the panel comprising:
- a core encapsulated within a panel frame of reinforced phenolic material, the core having first and second faces thereof, and a periphery thereof, the panel frame including first and second skins attached to the first and second faces of the core;
- one or more closeouts disposed between the skins about the periphery of the core, with the one or more closeouts being attached to the first and second skins; and
- a heating element adjacent the interior face of the panel, wherein the heating element is a resistive heating element including electrically-conductive carbon fiber material in a perforated film, the heating element including an electrical bus positioned at each one of two opposing ends.

14. The panel of claim 13, wherein the heating element is positioned on the interior face of the panel.

15. The panel of claim 13, wherein the heating element is embedded into the first skin of the panel, and integrally joined thereto by the reinforced phenolic material.

16. The panel of claim 1, wherein the heating element is a first heating element, the panel further comprising at least one additional heating element coupled to the first heating element in series.

17. The panel of claim 16, wherein the first heating element and the at least one additional heating element have substantially equivalent surface area and electrical resistance to provide a plurality of uniformly-heated areas within the panel.

18. The panel of claim 16, wherein the first heating element and the at least one additional heating element have at least one of substantially different surface area and substantially different electrical resistance to provide a plurality of non-uniformly-heated areas within the panel.

19. A flame retardant panel, having an exterior face thereof adapted for attachment to a support frame and an interior face thereof adapted for defining a boundary of a compartment, the flame retardant panel comprising:
- a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and
- a layer of flame retardant material attached to the second skin of the panel frame and extending outwardly therefrom to at least partially define the exterior face of the flame retardant panel, wherein the layer of flame retardant material further comprises a layer of intumescent material attached to the second skin,
- wherein the layer of intumescent coating is a composite structure including an intumescent material disposed in a fibrous mat, and
- wherein the layer of intumescent material includes a cured epoxy resin to form a pre-cured layer of intumescent material, and the panel further includes adhesive bonding the pre-cured layer of intumescent material to the second skin.

20. A flame retardant panel, having an exterior face thereof adapted for attachment to a support frame and an interior face thereof adapted for defining a boundary of a compartment, the flame retardant panel comprising:
- a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and
- a layer of flame retardant material attached to the second skin of the panel frame and extending outwardly therefrom to at least partially define the exterior face of the flame retardant panel, wherein the layer of flame retardant material further comprises a layer of intumescent material attached to the second skin, wherein the layer of intumescent coating is a composite structure including an intumescent material disposed in a fibrous mat, and wherein the layer of intumescent material is impregnated with phenolic resin, placed against the second skin of reinforced phenolic resin and co-cured therewith.

21. The flame retardant panel of claim 19, further comprising one or more ribs of reinforced phenolic material connecting the first and second skins to one another and disposed inwardly from the periphery of the primary core.

22. The flame retardant core of claim 21, wherein the primary core is a pre-cured reinforced core, including at least one reinforced phenolic rib and two or more foam strips, the at least one phenolic rib being positioned between two adjacent ones of the two or more foam strips.

23. A flame retardant panel, having an exterior face thereof adapted for attachment to a support frame and an interior face thereof adapted for defining a boundary of a compartment, the flame retardant panel comprising:

a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins;

a layer of flame retardant material attached to the second skin of the panel frame and extending outwardly therefrom to at least partially define the exterior face of the flame retardant panel; and one or more ribs of reinforced phenolic material connecting the first and second skins to one another and disposed inwardly from the periphery of the primary core, wherein the primary core comprises a plurality of groupings, each formed from a plurality of plastic foam strips helically wound together in a side-by-side relationship by rovings of fibrous material, with the groupings being disposed in a side-by-side relationship with one another and joined by first and second adhesive scrims on the first and second faces of the primary core, such that faying portions of the fibrous rovings of adjacent groupings form reinforcements for the reinforced phenolic ribs.

24. The flame retardant panel of claim 19, wherein one or more of the one or more closeouts is machineable to include at least one mating surface.

25. The flame retardant panel of claim 24, wherein the mating surface is a lap joint.

26. The flame retardant panel of claim 25, wherein the interior face of the panel defines a plane of the panel, the closeout includes at least one bore therethrough extending substantially perpendicularly to the plane of the panel.

27. The flame retardant panel of claim 19, wherein the primary core further comprises at least one tapping block, with the tapping block including a block of reinforced phenolic material and a metal plate encapsulated within the block, the tapping plate being adapted to be drilled and tapped so as to provide the panel with a mounting area.

28. The flame retardant panel of claim 19, wherein the primary core comprises a plastic closed cell foam of polyisocyanurate material.

29. The flame retardant panel of claim 19, wherein the primary core comprises a balsa wood material.

30. The flame retardant panel of claim 19, wherein:

the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel; and the thickness of the panel varies and includes at least a first and a second thickness thereof, within the periphery of the primary core.

31. The flame retardant panel of claim 30, wherein the layer of flame retardant material attached to the second skin of the panel frame and extending outwardly therefrom to at least partially define the exterior face of the panel extends only partially across the entirety of the exterior face of the panel, throughout one but not both of the first and second thicknesses of the panel.

32. The panel of claim 10, wherein the heating element is a first heating element, the panel further comprising at least one additional heating element coupled to the first heating element in series.

33. The panel of claim 32, wherein the first heating element and the at least one additional heating element have substantially equivalent surface area and electrical resistance to provide a plurality of uniformly-heated areas within the panel.

34. The panel of claim 32, wherein the first heating element and the at least one additional heating element have at least one of substantially different surface area and substantially different electrical resistance to provide a plurality of non-uniformly-heated areas within the panel.

35. The panel of claim 12, wherein the heating element is a first heating element, the panel further comprising at least one additional heating element coupled to the first heating element in series.

36. The panel of claim 35, wherein the first heating element and the at least one additional heating element have substantially equivalent surface area and electrical resistance to provide a plurality of uniformly-heated areas within the panel.

37. The panel of claim 35, wherein the first heating element and the at least one additional heating element have at least one of substantially different surface area and substantially different electrical resistance to provide a plurality of non-uniformly-heated areas within the panel.

38. The panel of claim 13, wherein the heating element is a first heating element, the panel further comprising at least one additional heating element coupled to the first heating element in series.

39. The panel of claim 38, wherein the first heating element and the at least one additional heating element have substantially equivalent surface area and electrical resistance to provide a plurality of uniformly-heated areas within the panel.

40. The panel of claim 38, wherein the first heating element and the at least one additional heating element have at least one of substantially different surface area and substantially different electrical resistance to provide a plurality of non-uniformly-heated areas within the panel.

41. The flame retardant panel of claim 20, further comprising one or more ribs of reinforced phenolic material connecting the first and second skins to one another and disposed inwardly from the periphery of the primary core.

42. The flame retardant core of claim 41, wherein the primary core is a pre-cured reinforced core, including at least one reinforced phenolic rib and two or more foam strips, the at least one phenolic rib being positioned between two adjacent ones of the two or more foam strips.

43. The flame retardant panel of claim 20, wherein one or more of the one or more closeouts is machineable to include at least one mating surface.

44. The flame retardant panel of claim 43, wherein the mating surface is a lap joint.

45. The flame retardant panel of claim 44, wherein the interior face of the panel defines a plane of the panel, the closeout includes at least one bore therethrough extending substantially perpendicularly to the plane of the panel.

46. The flame retardant panel of claim 23, wherein one or more of the one or more closeouts is machineable to include at least one mating surface.

47. The flame retardant panel of claim 46, wherein the mating surface is a lap joint.

48. The flame retardant panel of claim 47, wherein the interior face of the panel defines a plane of the panel, the closeout includes at least one bore therethrough extending substantially perpendicularly to the plane of the panel.

49. The flame retardant panel of claim 20, wherein the primary core further comprises at least one tapping block, with the tapping block including a block of reinforced phenolic material and a metal plate encapsulated within the block, the tapping plate being adapted to be drilled and tapped so as to provide the panel with a mounting area.

50. The flame retardant panel of claim 23, wherein the primary core further comprises at least one tapping block, with the tapping block including a block of reinforced phenolic material and a metal plate encapsulated within the block, the tapping plate being adapted to be drilled and tapped so as to provide the panel with a mounting area.

51. The flame retardant panel of claim 20, wherein the primary core comprises a plastic closed cell foam of polyisocyanurate material.

52. The flame retardant panel of claim 23, wherein the primary core comprises a plastic closed cell foam of polyisocyanurate material.

53. The flame retardant panel of claim 20, wherein the primary core comprises a balsa wood material.

54. The flame retardant panel of claim 23, wherein the primary core comprises a balsa wood material.

55. The flame retardant panel of claim 20, wherein:
the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel; and
the thickness of the panel varies and includes at least a first and a second thickness thereof, within the periphery of the primary core.

56. The flame retardant panel of claim 55, wherein the layer of flame retardant material attached to the second skin of the panel frame and extending outwardly therefrom to at least partially define the exterior face of the panel extends only partially across the entirety of the exterior face of the panel, throughout one but not both of the first and second thicknesses of the panel.

57. The flame retardant panel of claim 23, wherein:
the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel; and
the thickness of the panel varies and includes at least a first and a second thickness thereof, within the periphery of the primary core.

58. The flame retardant panel of claim 57, wherein the layer of flame retardant material attached to the second skin of the panel frame and extending outwardly therefrom to at least partially define the exterior face of the panel extends only partially across the entirety of the exterior face of the panel, throughout one but not both of the first and second thicknesses of the panel.

* * * * *